United States Patent
Gratz et al.

(10) Patent No.: US 11,625,756 B2
(45) Date of Patent: Apr. 11, 2023

(54) UNINSTALLED SOFTWARE APPLICATION IDENTIFICATION AND PROCESSING VIA A COMPUTER-EXECUTABLE TOOL CONFIGURED TO IDENTIFY UNRESOLVED PROGRAM LINKS

(71) Applicant: Groupon, Inc., Chicago, IL (US)

(72) Inventors: Eli Gratz, Chicago, IL (US); Nicolas Roth, Herrin, IL (US); Matthew Aaron Gilk, Chicago, IL (US)

(73) Assignee: Groupon, Inc., Chicago, IL (US)

( * ) Notice: Subject to any disclaimer, the term of this patent is extended or adjusted under 35 U.S.C. 154(b) by 0 days.

(21) Appl. No.: 17/027,298

(22) Filed: Sep. 21, 2020

(65) Prior Publication Data

US 2021/0073861 A1    Mar. 11, 2021

Related U.S. Application Data

(63) Continuation of application No. 14/207,456, filed on Mar. 12, 2014, now Pat. No. 10,846,749.

(51) Int. Cl.
  *G06Q 30/00* (2012.01)
  *G06Q 30/0251* (2023.01)
(52) U.S. Cl.
  CPC .............. *G06Q 30/0267* (2013.01)
(58) Field of Classification Search
  CPC .............................................. G06Q 30/0267
  See application file for complete search history.

(56) References Cited

U.S. PATENT DOCUMENTS

| | | |
|---|---|---|
| 5,734,852 A | 3/1998 | Zias et al. |
| 6,425,120 B1 | 7/2002 | Morganelli et al. |
| 6,446,135 B1 | 9/2002 | Koppolu et al. |
| 6,470,340 B1 | 10/2002 | Kawai et al. |
| 6,606,654 B1 | 8/2003 | Borman et al. |
| 7,644,144 B1 | 1/2010 | Horvitz et al. |
| 8,271,884 B1 | 9/2012 | Smaltz |
| 8,321,352 B1 | 11/2012 | Rameshkumar et al. |
| 8,409,000 B1 | 4/2013 | Colaco et al. |
| 8,843,122 B1 | 9/2014 | Wick et al. |
| 9,160,550 B1 | 10/2015 | Morrison et al. |

(Continued)

OTHER PUBLICATIONS

Agarwal; Exploiting Rich Telecom Data for Increased Monetization; IEEE 2012; pp. 63-68; 2012.

(Continued)

*Primary Examiner* — Radu Andrei
(74) *Attorney, Agent, or Firm* — Alston & Bird LLP

(57) ABSTRACT

Methods, apparatuses, and computer program products are provided that utilize a computer-executable tool to identify uninstalled software applications on a particular device. The computer-executable tool is configured to identify the uninstalled software applications based on identifying unresolved program links without affecting execution of other applications on the particular device. Additional processing associated with uninstalled applications may be performed. For example identify, generate, and/or otherwise present impressions associated with the uninstalled application programs. In this regard, for example, such impressions may be presented as part of providing promotions associated with such uninstalled application programs.

20 Claims, 19 Drawing Sheets

(56) References Cited

U.S. PATENT DOCUMENTS

| | | |
|---|---|---|
| 9,443,071 B2 | 9/2016 | Horton |
| 9,628,575 B1 | 4/2017 | Lewis et al. |
| 2001/0034711 A1 | 10/2001 | Tashenberg |
| 2001/0056398 A1 | 12/2001 | Scheirer |
| 2004/0122735 A1 | 6/2004 | Meshkin |
| 2004/0198319 A1 | 10/2004 | Whelan et al. |
| 2005/0109828 A1 | 5/2005 | Jay et al. |
| 2006/0004626 A1 | 1/2006 | Holmen et al. |
| 2006/0015851 A1 | 1/2006 | Poole |
| 2007/0027866 A1 | 2/2007 | Schmidt-Karaca |
| 2007/0027987 A1 | 2/2007 | Tripp et al. |
| 2007/0086357 A1 | 4/2007 | Okmianski et al. |
| 2007/0088603 A1 | 4/2007 | Jouppi et al. |
| 2007/0143186 A1 | 6/2007 | Apple et al. |
| 2007/0174259 A1 | 7/2007 | Amjadi |
| 2007/0261102 A1 | 11/2007 | Spataro et al. |
| 2008/0022290 A1 | 1/2008 | Ochiai et al. |
| 2008/0103896 A1 | 5/2008 | Flake et al. |
| 2008/0104026 A1 | 5/2008 | Koran |
| 2009/0083455 A1 | 3/2009 | Sun et al. |
| 2009/0164320 A1 | 6/2009 | Galit |
| 2009/0240677 A1 | 9/2009 | Parekh et al. |
| 2010/0100615 A1 | 4/2010 | Lee et al. |
| 2010/0114683 A1 | 5/2010 | Wessels et al. |
| 2010/0131901 A1 | 5/2010 | Takahashi et al. |
| 2010/0246535 A1 | 9/2010 | Lindner et al. |
| 2011/0173055 A1 | 7/2011 | Ross et al. |
| 2011/0173072 A1 | 7/2011 | Ross et al. |
| 2011/0238506 A1* | 9/2011 | Perkowski .......... G06F 16/9554 705/14.73 |
| 2011/0263296 A1 | 10/2011 | Baietto et al. |
| 2012/0030337 A1 | 2/2012 | Bang |
| 2012/0047126 A1 | 2/2012 | Branscome et al. |
| 2012/0116905 A1 | 5/2012 | Futty et al. |
| 2012/0131609 A1 | 5/2012 | Fernandez et al. |
| 2012/0171952 A1 | 7/2012 | Ohira et al. |
| 2012/0185843 A1 | 7/2012 | Burke et al. |
| 2012/0239494 A1 | 9/2012 | Hu et al. |
| 2012/0265606 A1 | 10/2012 | Patnode |
| 2012/0284463 A1 | 11/2012 | Srinivasan et al. |
| 2012/0290405 A1 | 11/2012 | Talluri |
| 2013/0019162 A1 | 1/2013 | Smaltz |
| 2013/0019234 A1 | 1/2013 | Pardehpoosh et al. |
| 2013/0036016 A1 | 2/2013 | Pattan et al. |
| 2013/0072169 A1 | 3/2013 | Ross et al. |
| 2013/0159103 A1 | 6/2013 | Foroughi et al. |
| 2013/0191316 A1 | 7/2013 | Etchegoyen |
| 2013/0232183 A1 | 9/2013 | Lee et al. |
| 2013/0254372 A1 | 9/2013 | Pierce |
| 2013/0262204 A1 | 10/2013 | Stiles et al. |
| 2013/0263182 A1 | 10/2013 | Ivy et al. |
| 2013/0275260 A1 | 10/2013 | Ito |
| 2013/0311300 A1 | 11/2013 | Scarborough |
| 2013/0331070 A1 | 12/2013 | Aldecoa |
| 2013/0339439 A1 | 12/2013 | Deng |
| 2014/0007445 A1 | 1/2014 | Yang |
| 2014/0012814 A1 | 1/2014 | Bercovici et al. |
| 2014/0025469 A1 | 1/2014 | Mishuku |
| 2014/0033216 A1 | 1/2014 | Wang et al. |
| 2014/0074445 A1 | 3/2014 | Van et al. |
| 2014/0074601 A1 | 3/2014 | Delug |
| 2014/0074615 A1 | 3/2014 | Hope et al. |
| 2014/0108155 A1 | 4/2014 | Johnson, Jr. |
| 2014/0113588 A1 | 4/2014 | Chekina et al. |
| 2014/0156992 A1 | 6/2014 | Medin et al. |
| 2014/0157387 A1 | 6/2014 | Lee et al. |
| 2014/0164081 A1 | 6/2014 | Thompson et al. |
| 2014/0164186 A1 | 6/2014 | Lee et al. |
| 2014/0188636 A1 | 7/2014 | Vandyke et al. |
| 2014/0201655 A1 | 7/2014 | Mahaffey et al. |
| 2014/0201681 A1 | 7/2014 | Mahaffey et al. |
| 2014/0214921 A1 | 7/2014 | Tiger et al. |
| 2014/0250433 A1 | 9/2014 | Stekkelpak et al. |
| 2014/0281249 A1 | 9/2014 | Waldspurger et al. |
| 2014/0282245 A1 | 9/2014 | Scarborough |
| 2014/0298292 A1 | 10/2014 | Minster et al. |
| 2014/0316890 A1 | 10/2014 | Kagan |
| 2014/0330647 A1 | 11/2014 | Christodorescu et al. |
| 2014/0330650 A1 | 11/2014 | Karmarkar et al. |
| 2015/0007167 A1 | 1/2015 | Mody et al. |
| 2015/0025964 A1 | 1/2015 | Awati |
| 2015/0026665 A1 | 1/2015 | Chen et al. |
| 2015/0052605 A1 | 2/2015 | Yu |
| 2015/0081906 A1 | 3/2015 | Backholm et al. |
| 2015/0088955 A1 | 3/2015 | Hendrick et al. |
| 2015/0148021 A1 | 5/2015 | Jeyakeerthi |
| 2015/0163186 A1 | 6/2015 | Tian |
| 2015/0186913 A1 | 7/2015 | Mann et al. |
| 2015/0193546 A1* | 7/2015 | Lipton .................... G06F 9/445 717/178 |
| 2015/0254731 A1 | 9/2015 | Ohayon et al. |
| 2015/0301865 A1 | 10/2015 | Jin et al. |
| 2016/0008720 A1 | 1/2016 | Inukai et al. |
| 2016/0055256 A1 | 2/2016 | Look et al. |
| 2016/0110754 A1 | 4/2016 | Miyazaki et al. |
| 2016/0275560 A1 | 9/2016 | Ito et al. |
| 2016/0371729 A1 | 12/2016 | Glover et al. |
| 2017/0068531 A1 | 3/2017 | Ech-Chergui et al. |

OTHER PUBLICATIONS

Agarwal; Exploiting Rich Telecom Data for Increased; 2012 IEEE; pp. 63-68; 2012.
Kurkovski; Using principles of pervasive computing to design m-commerce applications; IEEE 2005; 6 pages; 2005.
Kurkovski; Using principles of pervasive computing to design m-commerce applications; ITCC 05' 6 pages; 2005.
Swithinbank; Planning and managing the deployment of WebSphere Commerce: IBM Books; 118 pages; Jun. 2008.
Swithinbank; Planning and managing the deployment of WebSphere Commerce; IBM Jun. 2008; 118 pages; 2008.
Edirisinghe; Location based advertising framework for mobiel and web applications; ICT 2013; pp. 68-74; 2013.
Ivkovic; Affiliate Internet Marketing: Concept and Application Analysis; ICEMT 2010; pp. 319-323; 2010.
Kurkovsky; Using principles of pervasive computing to design m-commerce applications; ITCC'05; 6 pges; 2005.
Ros; Location Based Services with Personal Area Network; CCWMC 2011; pp. 432-437; 2011.
U.S. Patent Application filed on Mar. 12, 2014, U.S. Appl. No. 14/207,427.
U.S. Patent Application filed on Mar. 12, 2014, U.S. Appl. No. 14/207,450.
U.S. Patent Application filed on Mar. 12, 2014, U.S. Appl. No. 14/207,456.
U.S. Patent Application filed on Mar. 12, 2014, U.S. Appl. No. 14/207,464.
Unhelkar; The Enterprise Mobile Applications Development Framework; IEEE 2010; pp. 33-39; 2010.
Zhang; Raffle of Mobile Phones to Pay; ICETC2010; pp. V4-236-V4-238; 2010.
U.S. Appl. No. 14/207,456, filed Mar. 12, 2014, U.S. Pat. No. 10,846,749, Issued.

* cited by examiner

Running Processes 500

Base 502

Hangouts 504

Foursquare 506

RetailMeNot 508

DarkSky 510

Groupon 512

Google 514 com.apple.Stream 516

FIG. 5

Celebs & Style Lover

Outdoorsy

Financial Whiz

UNINSTALLED SOFTWARE APPLICATION IDENTIFICATION AND PROCESSING VIA A COMPUTER-EXECUTABLE TOOL CONFIGURED TO IDENTIFY UNRESOLVED PROGRAM LINKS

CROSS-REFERENCE TO RELATED APPLICATIONS

This application is a continuation of U.S. Non-Provisional patent application Ser. No. 14/207,456 entitled "METHOD AND SYSTEM FOR OFFERING PROMOTION IMPRESSIONS USING APPLICATION PROGRAMS" filed Mar. 12, 2014, the contents of which are incorporated herein by reference in their entirety.

TECHNOLOGICAL FIELD

Example embodiments of the present invention relate generally to promotion management and, more particularly, to providing impressions of promotions to consumers using mobile computing devices.

BACKGROUND

Via electronic networks (e.g., the Internet), promotional systems provide promotions associated with merchants to consumer devices. Certain promotional and marketing services notify consumers about promotions via the consumers' mobile computing devices. In this regard, areas for improving current mobile promotion notification techniques have been identified and technical solutions have been implemented in exemplary embodiments.

BRIEF SUMMARY

In accordance with one exemplary embodiment, a computer-executed method is provided for detecting application programs on a mobile computing device. The method includes initiating, using a promotion application program installed on a mobile computing device, a plurality of mobile software program communication requests in order to detect one or more additional application programs installed on the mobile computing device, the promotion application program associated with a promotion and marketing service. The method also includes programmatically generating, within the promotion application program, an indication of the one or more additional application programs installed on the mobile computing device.

In accordance with another exemplary embodiment, one or more non-transitory computer-readable media having encoded thereon one or more computer-executable instructions are provided for performing a method for detecting application programs on a mobile computing device. The method includes initiating, using a promotion application program installed on a mobile computing device, a plurality of mobile software program communication requests in order to detect one or more additional application programs installed on the mobile computing device, the promotion application program associated with a promotion and marketing service. The method also includes programmatically generating, within the promotion application program, an indication of the one or more additional application programs installed on the mobile computing device.

In accordance with another exemplary embodiment, a mobile computing device is provided. The mobile computing device includes a storage device for storing one or more computer-executable instructions for programmatically executing a promotion application program, and one or more computer-executable instructions for programmatically executing one or more additional application programs. The mobile computing device also includes a processing device configured to programmatically execute the promotion application program to initiate a plurality of mobile software program communication requests in order to detect the one or more additional application programs installed on the mobile computing device, wherein execution of the promotion application program generates, within the promotion application program, an indication of the one or more additional application programs installed on the mobile computing device.

In accordance with another exemplary embodiment, a computer-executed method is provided for determining profile data of a user of a promotion application program on a mobile computing device. The method includes programmatically receiving, from a promotion application program running on a mobile computing device, an indication of one or more additional application programs installed on the mobile computing device. The method also includes programmatically determining a characteristic of a first application program within the one or more additional application programs. The method also includes based on the characteristic of the first application program, programmatically generating a first profile data characteristic of a user of the mobile computing device. The method further includes storing the first profile data characteristic associated with the user of the mobile computing device on a non-transitory storage device.

In accordance with another exemplary embodiment, one or more non-transitory computer-readable media having encoded thereon one or more computer-executable instructions are provided for a method for determining profile data of a user of an application program on a mobile computing device. The method includes programmatically receiving, from a promotion application program running on a mobile computing device, an indication of one or more additional application programs installed on the mobile computing device. The method also includes programmatically determining a characteristic of a first application program within the one or more additional application programs. The method also includes, based on the characteristic of the first application program, programmatically generating a first profile data characteristic of a user of the mobile computing device. The method further includes storing the first profile data characteristic associated with the user of the mobile computing device on a non-transitory storage device.

In accordance with another exemplary embodiment, a computing device is provided. The computing device includes a network device configured to receive, from a promotion application program running on a mobile computing device, an indication of one or more additional application programs installed on the mobile computing device. The computing device also includes a processing device configured to programmatically determine a characteristic of a first application program within the one or more additional application programs, and based on the characteristic of the first application program, programmatically generate a first profile data characteristic of a user of the mobile computing device. The computing device further includes a non-transitory storage device for storing the first profile data characteristic associated with the user of the mobile computing device.

In accordance with another exemplary embodiment, a computer-executed method is provided for providing an application program to a user of a mobile computing device. The method includes programmatically receiving, at a promotion application program, an indication of one or more additional application programs installed on the mobile computing device. The method also includes programmatically determining, using the promotion application program, that a first application program is not included in the one or more additional application programs. The method also includes using the promotion application program to render, on a visual display of the mobile computing device, an impression of a promotion provided by a promotion and marketing service. The method further includes using the promotion application program to render, on the visual display of the mobile computing device, a representation of the first application program, the representation of the first application program associated with the impression of the promotion, the representation of the first application program configured to enable download or installation of the first application program on the mobile computing device.

In accordance with another exemplary embodiment, one or more non-transitory computer-readable media having encoded thereon one or more computer-executable instructions are provided for performing a method for providing an application software program to a user of a mobile computing device. The method includes programmatically receiving, at a promotion application program, an indication of one or more additional application programs installed on the mobile computing device. The method also includes programmatically determining, using the promotion application program, that a first application program is not included in the one or more additional application programs. The method also includes using the promotion application program to render, on a visual display of the mobile computing device, an impression of a promotion provided by a promotion and marketing service. The method further includes using the promotion application program to render, on the visual display of the mobile computing device, a representation of the first application program, the representation of the first application program associated with the impression of the promotion, the representation of the first application program configured to enable download or installation of the first application program on the mobile computing device.

In accordance with another exemplary embodiment, a mobile computing device is provided. The mobile computing device includes a visual display and a processing device configured to programmatically receive, at a promotion application program, an indication of one or more additional application programs installed on the mobile computing device. The processing device is also configured to programmatically determine, using the promotion application program, that a first application program is not included in the one or more additional application programs. The processing device is also configured to use the promotion application program to render, on the visual display of the mobile computing device, an impression of a promotion provided by a promotion and marketing service. The processing device is also configured to use the promotion application program to render, on the visual display of the mobile computing device, a representation of the first application program, the representation of the first application program associated with the impression of the promotion, the representation of the first application program configured to enable download or installation of the first application program on the mobile computing device.

In accordance with another exemplary embodiment, a computer-executed method for a promotion and marketing service is provided. The method includes providing a computer-executable tool for installation on a first application program, the first application program provided by a first merchant configured for installation on a mobile computing device. The method also includes, upon installation of the first application program, using the computer-executable tool to programmatically generate an impression of a promotion, the promotion provided by a promotion and marketing service for a product or service offered by the first merchant. The impression of the promotion is generated within a user interface associated with the first application program.

In accordance with another exemplary embodiment, one or more non-transitory computer-readable media having encoded thereon one or more computer-executable instructions are provided for performing a method. The method includes providing a computer-executable tool for installation on a first application program, the first application program provided by a first merchant configured for installation on a mobile computing device. The method also includes, upon installation of the first application program, using the computer-executable tool to programmatically generate an impression of a promotion, the promotion provided by a promotion and marketing service for a product or service offered by the first merchant. The impression of the promotion is generated within a user interface associated with the first application software program.

In accordance with another exemplary embodiment, a mobile computing device is provided. The mobile computing device includes a storage device for storing a first application program associated with a first merchant, the first application program configured to include a computer-executable tool. The mobile computing device also includes a processing device configured to, upon installation of the first application program, use the computer-executable tool to programmatically generate an impression of a promotion, the promotion provided by a promotion and marketing service for a product or service offered by the first merchant, wherein the impression of the promotion is generated within a user interface associated with the first application program. The mobile computing device further includes a visual display for displaying the user interface associated with the first application program.

In accordance with another exemplary embodiment, a computer-executed method is provided on a mobile computing device. The method includes providing a promotion application program associated with a promotion and marketing service for installation on a mobile computing device. The method also includes, upon installation of the promotion application program, receiving, at the promotion application program, user input selecting a first impression of a first promotion associated with a first product or service offered by a first merchant. The method also includes, using the promotion application program to programmatically initiate detection of a first application program installed on the mobile computing device, the first application program associated with the first merchant. The method further includes, in response to the user input, using the promotion application program to automatically launch the first application program on the mobile computing device.

In accordance with another exemplary embodiment, one or more non-transitory computer-readable media having encoded thereon one or more computer-executable instructions are provided for performing a method. The method includes providing a promotion application program associated with a promotion and marketing service for installation on a mobile computing device. The method also includes, upon installation of the promotion application program, receiving, at the promotion application program, user input selecting a first impression of a first promotion associated with a first product or service offered by a first merchant. The method also includes using the promotion application program to programmatically initiate detection of a first application program installed on the mobile computing device, the first application program associated with the first merchant. The method further includes, in response to the user input, using the promotion application program to automatically launch the first application program on the mobile computing device.

In accordance with another exemplary embodiment, a mobile computing device is provided. The mobile computing device includes a storage device for storing one or more computer-executable instructions for programmatically executing a promotion application program associated with a promotion and marketing service. The mobile computing device also includes a processing device configured to programmatically execute the promotion application program in which the promotion application program receives user input selecting a first impression of a first promotion associated with a first product or service offered by a first merchant. The processing device is also configured to use the promotion application program to programmatically initiate detection of a first application program installed on the mobile computing device, the first application program associated with the first merchant. The processing device is also configured to, in response to the user input, use the promotion application program to automatically launch the first application program on the mobile computing device. The mobile computing device also includes a visual display for displaying user interfaces associated with the first application program and the promotion application program.

In accordance with another exemplary embodiment, a computer-executed method is provided for incentivizing download of an application program. The method includes providing a computer-executable tool for installation on a first application program, the first application program configured for installation on a mobile computing device. The method also includes, upon installation of the first application program, using the computer-executable tool to programmatically provide an impression of a promotion to a user of the mobile computing device.

In accordance with another exemplary embodiment, one or more non-transitory computer-readable media having encoded thereon one or more computer-executable instructions are provided for performing a method. The method includes providing a computer-executable tool for installation on a first application program, the first application program configured for installation on a mobile computing device. The method also includes upon installation of the first application program, using the computer-executable tool to programmatically provide an impression of a promotion to a user of the mobile computing device.

In accordance with another exemplary embodiment, a mobile computing device is provided. The mobile computing device includes a storage device for storing a computer-executable tool provided in a first application program. The mobile computing device also includes a processing device configured to, upon installation of the first application program on the mobile computing device, use the computer-executable tool to programmatically provide an impression of a promotion. The mobile computing device also includes a visual display for displaying the impression of the promotion.

In accordance with another exemplary embodiment, a computer-executed method is provided for incentivizing download of an application program. The method includes providing a computer-executable tool for installation on a first application program, the first application program configured for installation on a mobile computing device. The method also includes, upon installation of the first application program, using the computer-executable tool to programmatically initiate a determination of whether a promotion application program is installed on the mobile computing device. The method further includes, upon determining that the promotion application program is not installed on the mobile computing device, using the first application program to indicate an impression of a promotion to a user of the mobile computing device in association with a representation of the promotion application program to encourage download or installation of the promotion application program.

In accordance with another exemplary embodiment, one or more non-transitory computer-readable media having encoded thereon one or more computer-executable instructions are provided for performing a method. The method includes providing a computer-executable tool for installation on a first application program, the first application program configured for installation on a mobile computing device. The method also includes, upon installation of the first application program, using the computer-executable tool to programmatically initiate a determination of whether a promotion application program is installed on the mobile computing device. The method further includes, upon determining that the promotion application program is not installed on the mobile computing device, using the first application program to indicate an impression of a promotion to a user of the mobile computing device in association with a representation of the promotion application program to encourage download or installation of the promotion application program.

In accordance with another exemplary embodiment, a mobile computing device is provided. The mobile computing device includes a storage device for storing a computer-executable tool provided in a first application program. The mobile computing device also includes a processing device configured to, upon installation of the first application program, use the computer-executable tool to programmatically initiate a determination of whether a promotion application program is installed on the mobile computing device, and, upon determining that the promotion application program is not installed on the mobile computing device, use the first application program to generate an impression of a promotion to a user of the mobile computing device to encourage download or installation of the promotion application program. The mobile computing device also includes a visual display for displaying the impression of the promotion.

BRIEF DESCRIPTION OF THE DRAWINGS

The foregoing and other objects, aspects, features and advantages of exemplary embodiments will become more apparent and may be better understood by referring to the following description taken in conjunction with the accompanying drawings.

FIG. 5 illustrates a user interface rendered by a promotion application program detecting the processes running on a mobile computing device.

The accompanying drawings are not intended to be drawn to scale.

DETAILED DESCRIPTION

Exemplary embodiments provide computer systems, computer-executable methods and one or more non-transitory computer-readable media for managing promotions and, in some embodiments, for providing impressions of one or more promotions to a consumer using a promotion and marketing service. In some embodiments, the application programs installed by a consumer on his/her mobile computing device may be detected and used in recommending promotions to the consumer. The ability to recommend promotions for purchase that are of particular relevance to each consumer is important in a promotion and marketing service as it helps maintain an active and engaged customer base and maximize profits for the service. Impressions provided to a consumer, especially on a mobile computing device, can be intrusive. As such, it is critical to provide impressions of relevant promotions and to implicitly empower consumers to control the impressions that they receive.

Figure 1:
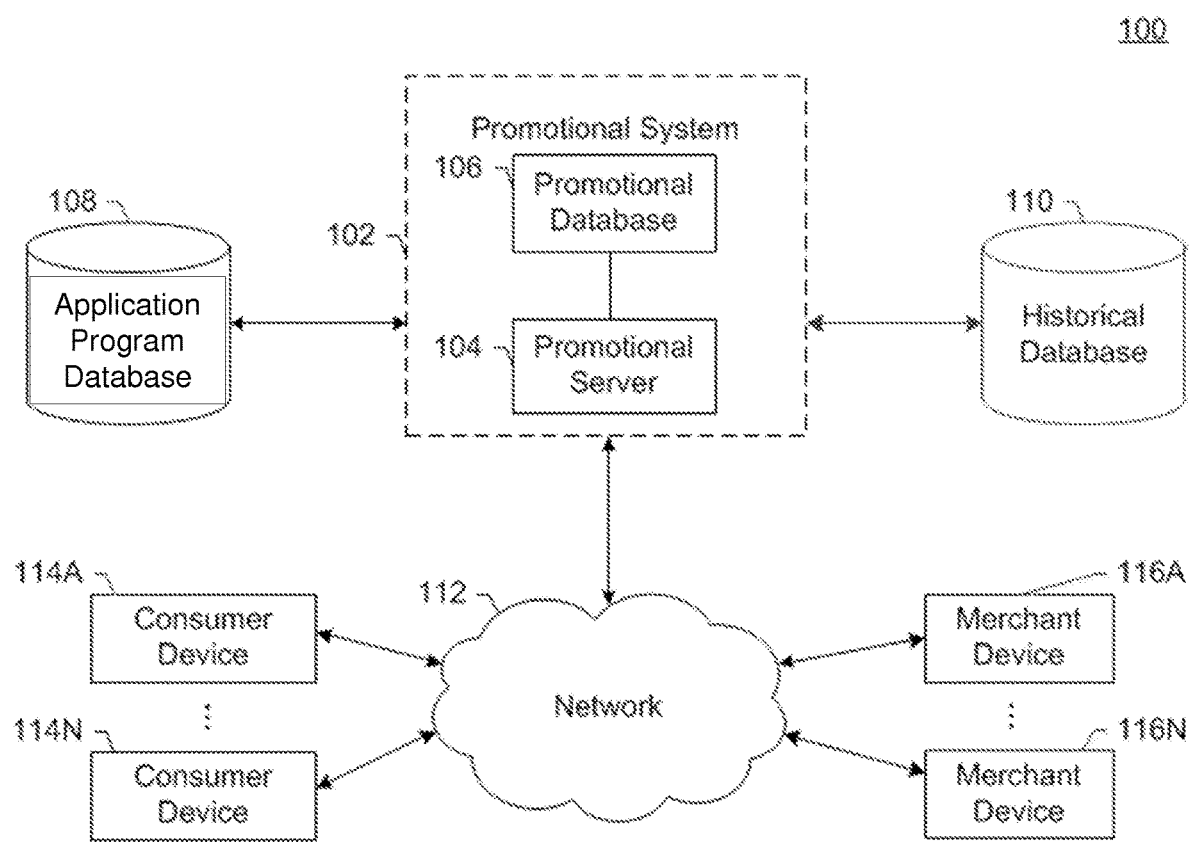
FIG. 1 is a block diagram illustrating an exemplary system within which exemplary embodiments may operate.

FIG. 1 is a block diagram illustrating an exemplary system within which exemplary embodiments may operate. An exemplary promotion and marketing service 100 may manage a promotional system 102 for managing the offer, purchase, and redemption of a set of promotions. Consumers and merchants may access the promotional system 102 via a network 112 (such as the Internet, or the like) using computer devices 114A through 114N and 116A through 116N, respectively. The promotional system 102 may include a promotional server 104 in communication with a promotional database 106 that stores the set of promotions managed by the promotion and marketing service. The promotional system 102 may have access to a local context database or any suitable data storage structure 108 that stores data indicating aspects of application programs installed on mobile computing devices of consumers, and a historical database 110 storing information regarding consumer profile data and prior activities performed by consumers. In various embodiments, promotional database 106, application program database 108, and historical database 110 may be distinct databases, or may alternatively refer to a single database.

Figure 2:
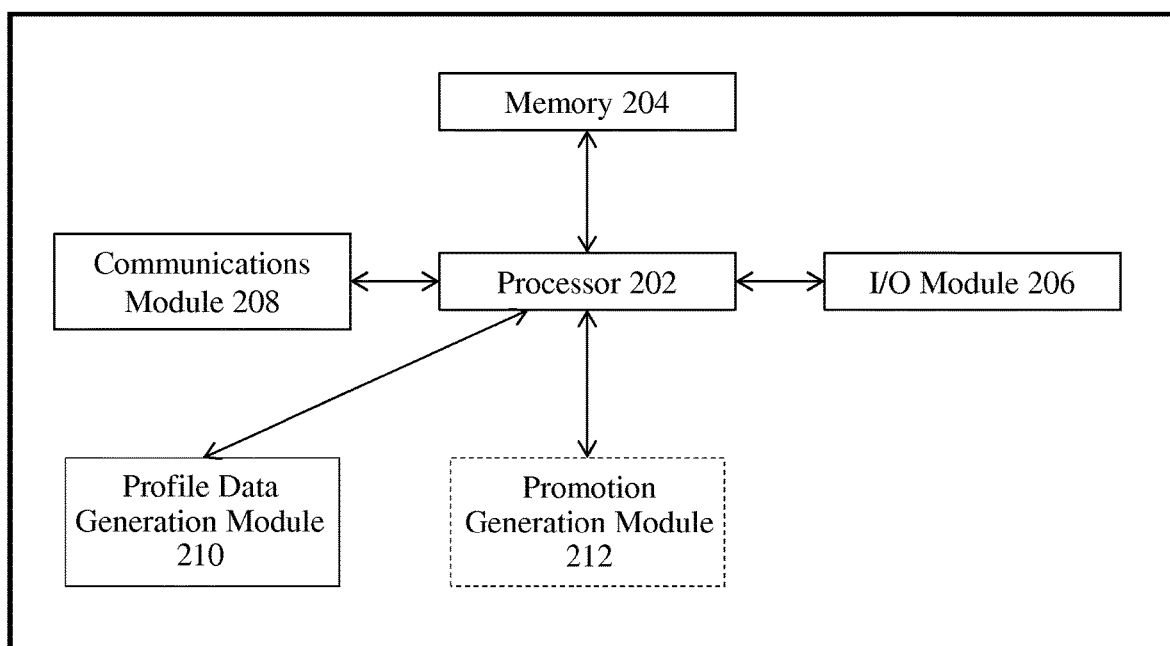
FIG. 2 is a block diagram illustrating exemplary modules of a computing device for use in a promotional server in accordance with certain exemplary embodiments.

The promotional server 104 may be embodied by a computing system, such as apparatus 200 shown in FIG. 2. As illustrated in FIG. 2, the apparatus 200 may include a processor 202, a memory 204, an input/output module 206, and a communications module 208. In some embodiments, the apparatus 200 may include a profile data generation module 210 configured to determine one or more profile data characteristics of a consumer based on, for example, the application programs installed on a mobile computing device of the consumer. In some embodiments, the apparatus 200 may include a promotion generation module 212 configured to select one or more promotions from all available promotions for recommendation to a particular consumer. Promotions may be recommended based on, for example, the profile data characteristics of the consumer as determined by the profile data generation module 210.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 202 may be embodied in a number of different ways and may, for example, include one or more processing devices configured to perform independently. Additionally or alternatively, the processor 202 may include one or more processors configured in tandem via a bus to enable independent execution of instructions, pipelining, and/or multithreading.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include an input/output module 206 that may, in turn, be in communication with processor 202 to provide output to the user and, in some embodiments, to receive an indication of a user input. The input/output module may comprise a user interface and may include a display. In such embodiments, the user interface may comprise a web user interface, a mobile application, a client device, a kiosk, or the like. In some embodiments, the input/output module 206 may also include a keyboard, a mouse, a touch screen, touch areas, soft keys, a microphone, a speaker, or other input/output mechanisms. The processor, or user interface circuitry including the processor, may be configured to control one or more functions of one or more user interface elements through computer program instructions (e.g., software and/or firmware) stored on a memory accessible to the processor (e.g., memory 204, onboard memory of the processor, and/or the like).

The communications module 208 may be any means such as a device or circuitry embodied in either hardware or a combination of hardware and software that is configured to receive and/or transmit data from/to a network and/or any other device or module in communication with the apparatus 200. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

In one embodiment, a consumer or merchant may use the apparatus 200 (e.g., as a kiosk) to communicate with the promotional system 102 to view promotion information or interact with promotions. However, in some embodiments of the present invention, the consumer or merchant may perform these functions from outside of the promotional system 102 using, for example, an end-user device, such as consumer device 114 or merchant device 116.

Figure 3:
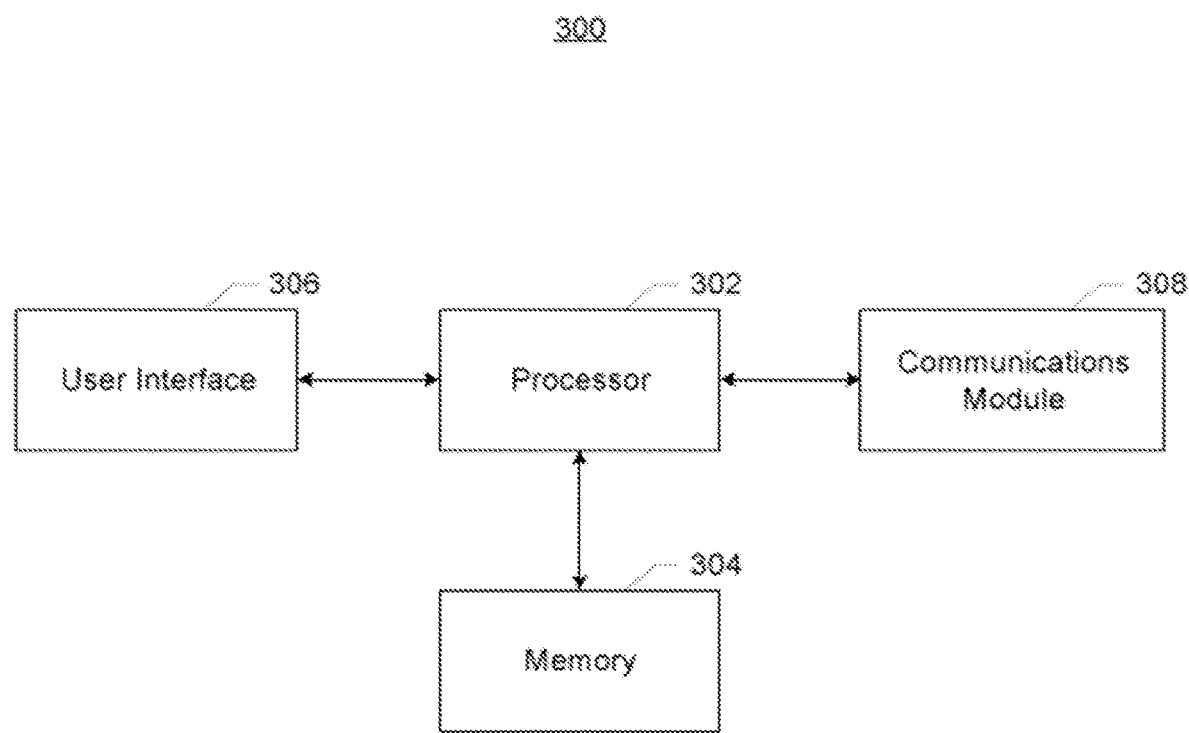
FIG. 3 is a block diagram illustrating exemplary modules of a computing device for use by a consumer or merchant in accordance with an exemplary embodiment.

Referring now to FIG. 3, a block diagram is illustrated showing an example end-user device, mobile computing device 300 that may be configured to run one or more application programs, for example, a promotion application program in communication with the promotional system 102, in accordance with embodiments of the present invention. In FIG. 3, the apparatus 300, which may embody consumer device 114 or merchant device 116, may include or otherwise be in communication with a processor 302, a memory 304, a communications module 308, and a user interface 306. In some embodiments, the processor (and/or co-processor or any other processing circuitry assisting or otherwise associated with the processor) may be in communication with the memory 304 via a bus for passing information among components of the apparatus. The memory 304 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 302 may be embodied in a number of different ways and may, for example, include one or more processing devices configured to perform independently. Additionally or alternatively, the processor may include one or more processors configured in tandem via a bus to enable independent execution of instructions, pipelining, and/or multithreading.

In an example embodiment, the processor 302 may be configured to execute instructions stored in the memory 304 or otherwise accessible to the processor. Alternatively or additionally, the processor may be configured to execute hard-coded functionality. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions, the instructions may specifically configure the processor 302 to perform the algorithms and/or operations described herein when the instructions are executed.

In some embodiments, the apparatus 300 may include a user interface 306 that may, in turn, be in communication with processor 302 to provide output to the user and, in some embodiments, to receive an indication of a user input. As such, the user interface 306 may include a display and may comprise a web user interface, a mobile application, a client device, a kiosk, or the like. In some embodiments, the user interface 306 may also include a keyboard, a mouse, a touch screen, touch areas, soft keys, a microphone, a speaker, or other input/output mechanisms. The processor 302, or user interface circuitry comprising the processor 302, may be configured to control one or more functions of one or more user interface elements through computer program instructions (e.g., software and/or firmware) stored on a memory accessible to the processor (e.g., memory 304, and/or the like).

The communications module 308 may be any means such as a device or circuitry embodied in either hardware or a combination of hardware and software that is configured to receive and/or transmit data from/to a network and/or any other device or module in communication with the apparatus 300 (e.g., promotional server 104 or, more generally, promotional system 102, other consumer devices 114 or merchant devices 116, or the like). In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms Although exemplary embodiments are described herein as implemented on a mobile computing device, one of ordinary skill will recognize that embodiments may similarly be implemented on any computing or communication device that is not configured to be mobile (e.g., a desktop computer) but that is capable of communication and that has sufficient processor power and memory capacity to perform the operations described herein.

I. Definitions of Terms

Certain terms used in connection with exemplary embodiments are defined below.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and is operable to provide example promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "merchant" may include, but is not limited to, a business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. One example merchant may be a running company that sells attire for use by a person who runs or participates in athletic activities.

As used herein, the term "consumer" may include, but is not limited to, a client, customer, purchaser, shopper, user, or the like, who may be in the position to or does exchange value for one or more vouchers under the terms defined by one or promotions. For example, and using the aforementioned running company as the example provider, a consumer may be an individual who is interested in purchasing running shoes.

As used herein, the term "consumer interface" may include any digitally rendered user interface displayed on a visual display device for enabling a consumer to interface with a promotion and marketing service. An exemplary consumer interface may enable a consumer to view one or more promotions, purchase one or more promotions, share one or more promotions with other consumers, receive messages and/or promotions from other consumers, receive messages from the promotion and marketing service, and the like. Exemplary consumer interfaces may be rendered in any desired form including, but not limited to, as a mobile application for display on a mobile computing device (e.g., a smartphone), a webpage or website for display on a mobile or non-mobile computing device via the Internet, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. Using the running company promotion as an example, the accepted value is $25 and the promotional value is $50. In this example, the residual value may be equal to the accepted value.

As used herein, the term "impression" may include a communication, a display, or other perceived indication, such as a flyer, print media, e-mail, text message, application alert, mobile applications, mobile notifications, other type of electronic interface or distribution channel and/or the like, of one or more promotions. For example, and using the aforementioned running company as the example provider, an email communication sent to consumers that indicates the availability of a promotion of $25 for $50 toward running shoes.

As used herein, the term "promotion score" refers to a programmatically generated quantitative or qualitative score or indication of the expected effectiveness of providing an impression of a promotion to a consumer. In some embodiments, the expected effectiveness may be indicated by a predicted probability or likelihood that the consumer will purchase the promotion offered by the impression.

As used herein, the term "voucher" may include, but is not limited to, any type of gift card, tender, electronic certificate, medium of exchange, or the like, that embodies the terms of the promotion from which it results and which may be used toward at least a portion of the purchase, acquisition, procurement, consumption, or the like, of goods, services and/or experiences. In some examples, a voucher may take the form of tender that has a given value that is exchangeable for goods, services and/or experiences and/or a reduction in a purchase price of a particular good, service or experience. In some examples, the voucher may have multiple values, such as an accepted value, a promotional value and/or a residual value. For example, using the aforementioned running company as the example provider, a voucher may comprise an electronic indication in a mobile application that shows $50 of value to spend at the running company. In some examples, the accepted value of the voucher is defined by the value exchanged for the voucher. In some examples, the promotional value of the voucher is defined by the promotion from which the voucher resulted and is the value of the voucher beyond the accepted value. In some examples, the residual value of the voucher is the value after redemption, the value after the expiry or other violation of a redemption parameter, the return or exchange value of the voucher, or the like.

As used herein, the term "redemption" may include the use, exchange or other presentation of a voucher for at least a portion of a good, service or experience as defined by the voucher and its related offer. In some examples, redemption includes the verification of validity of the voucher. In other example embodiments, redemption may include an indication that a particular voucher has been redeemed and thus no longer retains an actual, promotional and/or residual value (e.g., full redemption). In other example embodiments, redemption may include the redemption of at least a portion of a voucher's actual, promotional and/or residual value (e.g., partial redemption). An example of redemption, using the aforementioned running company as the example provider, is exchanging a $50 voucher and $50 for a $100 pair of running shoes.

As used herein, the term "mobile computing device" refers to any computing or communication device that is portable and is transported in normal usage (e.g., the iPhone™ mobile communication device, the Android™ mobile communication device, and the like), and that is capable of communication and that has sufficient processor power and memory capacity to perform the operations described herein.

As used herein, the terms "application program," "mobile application" and "mobile app" refer to computer-executable application software programmed or configured to run on a processing unit of a mobile computing device.

As used herein, the term "promotion application program" refers to an application program programmed or configured to run on a processing unit of a mobile computing device in order to enable a user of the computing device to use a promotion and marketing service. An exemplary promotion application program may be in constant or periodic communication with a remote computing device or server run by the promotion and marketing service to provide computer-executable functionality to the mobile computing device. An exemplary promotion application program may, for example, provide a user interface configured to render impressions of one or more promotions, receive user input selecting one or more impressions, and enable purchase of the promotions in response to user input.

As used herein, the term "module," encompasses hardware, software and/or firmware configured to perform one or more particular functions.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

As used herein, the term "set" refers to a collection of one or more items.

As used herein, the term "plurality" refers to two or more items.

As used herein, the terms "equal" and "substantially equal" refer interchangeably, in a broad lay sense, to exact equality or approximate equality within some tolerance.

As used herein, the terms "similar" and "substantially similar" refer interchangeably, in a broad lay sense, to exact sameness or approximate similarity within some tolerance.

As used herein, the terms "couple," "coupled" and "coupling" refer to a direct or indirect connection among two or more components. For example, a first component may be coupled to a second component directly or through one or more intermediate components.

Some embodiments of the present invention will now be described more fully hereinafter with reference to the accompanying drawings in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

II. Detection and Use of Application Programs in Offering Promotions

In certain exemplary embodiments, a promotion application program associated with a promotion and marketing service and executing on a mobile computing device may enable detection of all of the application programs installed on the mobile computing device. In some non-limiting embodiments, upon detection of the application programs, information on the application programs may be used by the promotion application programs to provide recommend promotions to the user of the mobile computing device.

Figure 4:
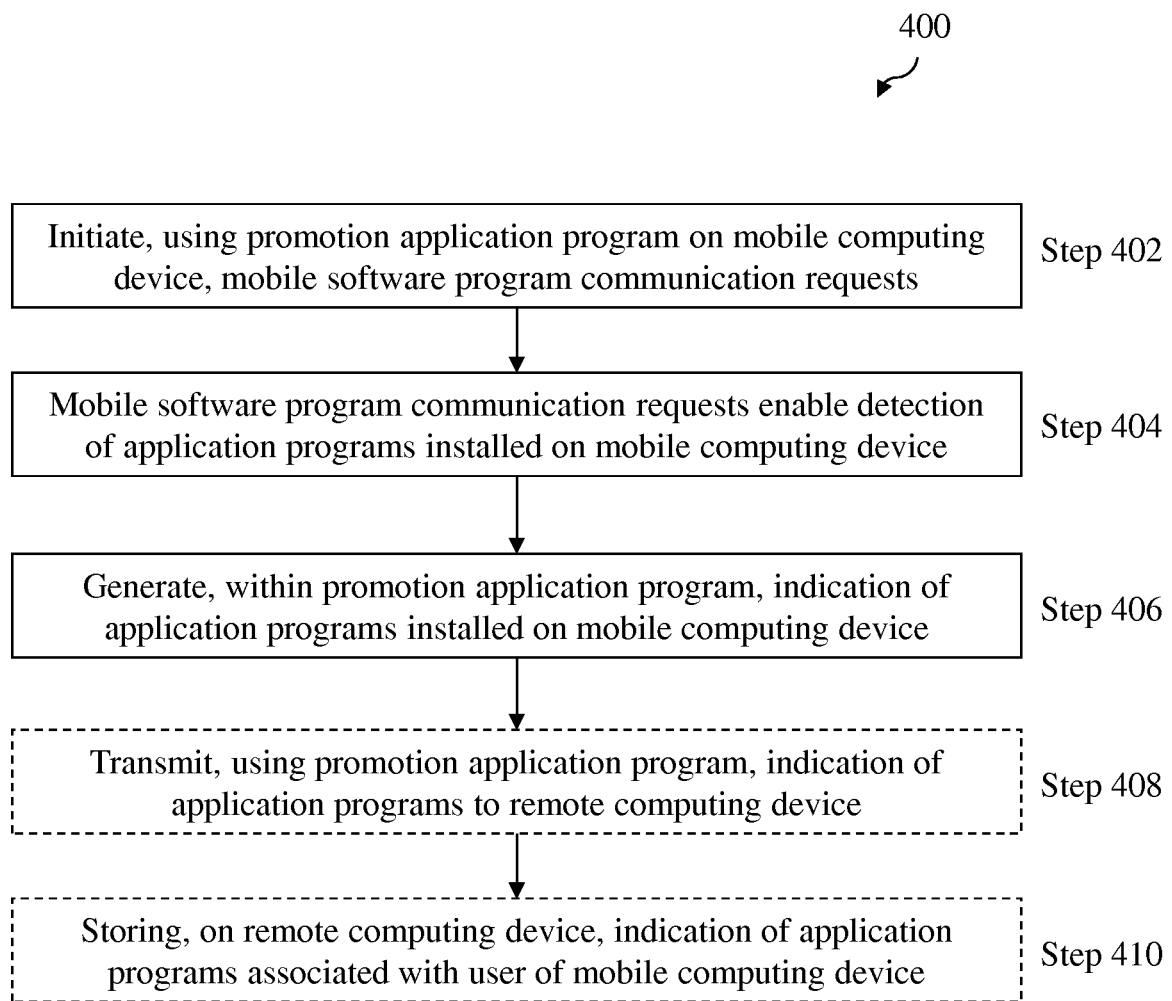
FIG. 4 is a flowchart illustrating an exemplary computer-executable method for detecting application programs installed on a mobile computing device using a promotion application program.

FIG. 4 is a flowchart illustrating an exemplary computer-executable method 400 for detecting application programs on a mobile computing device using a promotion application program. In step 402, the promotion application program may initiate one or more mobile software program communication requests configured to initiate detection of the application programs installed on the mobile computing device. In certain non-limiting embodiments, the promotion application program may initiate the communication requests at predetermined time intervals and/or upon launch of the promotion application program. In a preferred embodiment, the detection of the application programs is performed in the background does not interfere with the user's usage of the mobile computing device, for example, by avoiding actually launching the application programs.

In step 404, the mobile software program communication requests may enable detection of the application programs. In step 406, as a result of the mobile software program communication requests, an indication of the application programs installed on the mobile computing device may be generated by the promotion application program. In a non-limiting exemplary embodiment, the indication may include a listing of the application programs and, optionally, additional information on the application programs (e.g., a source or distributor of the application programs, a functionality or operation of the application programs, a download/install time of the application programs, a subject matter relevant to the application programs, and the like). The indication of the application programs within the promotion application program may be rendered visually on the mobile computing device for the user or may not be rendered visually in some embodiments. In some embodiments, the promotion application program may cause the indication of application programs to be stored in a non-transitory manner on the mobile computing device.

In some embodiments, an indication of certain application programs that are not installed on the mobile computing device may also be generated by the promotion application program. In one embodiment, a single listing of application programs may be generated in which the programs that are installed are indicated differently from the programs that are not installed, for example, in highlighted text.

In step 408, in some exemplary embodiments, the promotion application program may transmit the indication of the application programs to a computing device remote from the mobile computing device. In some cases, the remote computing device may be associated with the promotion and marketing service providing the promotion application program. For example, the remote computing device may be a server or database storing information associated with the promotion and marketing service and its users.

In step 410, in some exemplary embodiments, the remote computing device may store the indication of the application programs associated with the mobile computing device and/or associated with the user of the mobile computing device. This enables maintenance and update of a record of the mobile application programs used by a consumer using the promotion and marketing service.

A variety of techniques may be used to detect the application programs installed and/or running on the mobile computing device in the method of FIG. 4. In some embodiments, the detection of application programs does not involve analysis of the file system stored on the mobile computing device, but rather depends on analysis of installed application programs and/or programs or processes running on the mobile computing device.

In one embodiment, public links (similar to web links) associated with the application programs may be used to determine if the links are accessible from the mobile computing device. A predetermined list of links associated with certain application programs may be provided to the promotion application program. The promotion application program may attempt to access one or more links associated with application programs. If a corresponding application program is installed on the mobile computing device, then the link is "resolved" or successfully accessed, and a corresponding response is transmitted to the promotion application program. The promotion application thereby determines, based on the response, that the application program is installed on the mobile computing device. On the other hand, if the corresponding application program is not installed on the mobile computing device, then the link is not "resolved" or is unsuccessfully accessed, and no corresponding response is transmitted to the promotion application program. The promotion application program thereby determines, based on the lack of a response, that the application program is not installed on the mobile computing device.

The access and use of the application program links by the promotion application program does not load or interact with the application programs and merely determines the presence of the application programs. Similarly, the use of the links by the promotion application program avoids accessing the execution of any of the application programs and does not interfere with their execution. This enables the discreet determination of the application programs installed on the mobile computing device without adversely affecting user experience of the application programs and without making operational changes to the modules and processes running on the mobile computing device. Additionally, the access and use of the application program links by the promotion application program advantageously does not require system-level access or modifications to the operating system of the mobile computing device. Furthermore, the access and use of the application program links by the promotion application program does not require user interaction or authorization, which enhances reliability and efficiency of the determination of the application programs installed on the mobile computing device.

Certain exemplary application program links (or "schemas") have custom formats, for example:
macys:// for a Macy's application program,
sbux:// for a Starbucks application program,
twitter:// for a Twitter application program,
tweetbot:// for a Tweetbot Twitter Client application program,
zillowapp:// for a Zillow real estate application program,
yelp:// for a Yelp application program,
wordswithfriends:// for a Words with Friends Game application program,
wheresmywater:// for a Where's My Water Game application program,
waze:// for a Waze Traffic application program,
target-iphone:// for a Target application program,
feedly:// for a Feedly News Reader application program,
and the like.

As another example, Facebook application program includes links that start with "fb" and have a number appended to it, for example, fb544680418945285://

In certain exemplary embodiments, a system service of extended permissions (e.g., on the Android platform) may be used by the promotion application program to detect application programs installed on the mobile computing device. The promotion application program may request the system service for system data corresponding to the application programs. In some cases, the user of the mobile computing device may be asked to authorize or deny the request. If authorized, the system service may return a list of application programs to the promotion application program.

In certain exemplary embodiments, the promotion application program may review a list of running processes to determine if any of the processes correspond to application programs. The promotion application program may be provided with a correspondence between certain application programs and corresponding processes. FIG. 5 illustrates a user interface 500 rendered by a promotion application program detecting the processes 502, 504, 506, 508, 510, 512, 514, 516 running on a mobile computing device and two exemplary application programs ("Hangouts") and ("DarkSky") determined to correspond to two exemplary processes 504, 510.

In certain embodiments, the indication of application programs installed on a mobile computing device (as determined using, for example, the method of FIG. 4) may be used to programmatically generate profile data characteristics associated with the user of the mobile computing device. The application programs that the user is interested in may reveal the user's past consumption activities and may be useful in predicting in his future consumption activities. The identification of the application programs may be used by the promotion and marketing service to predict the types of promotions that may be of most interest to the user.

Figure 6:
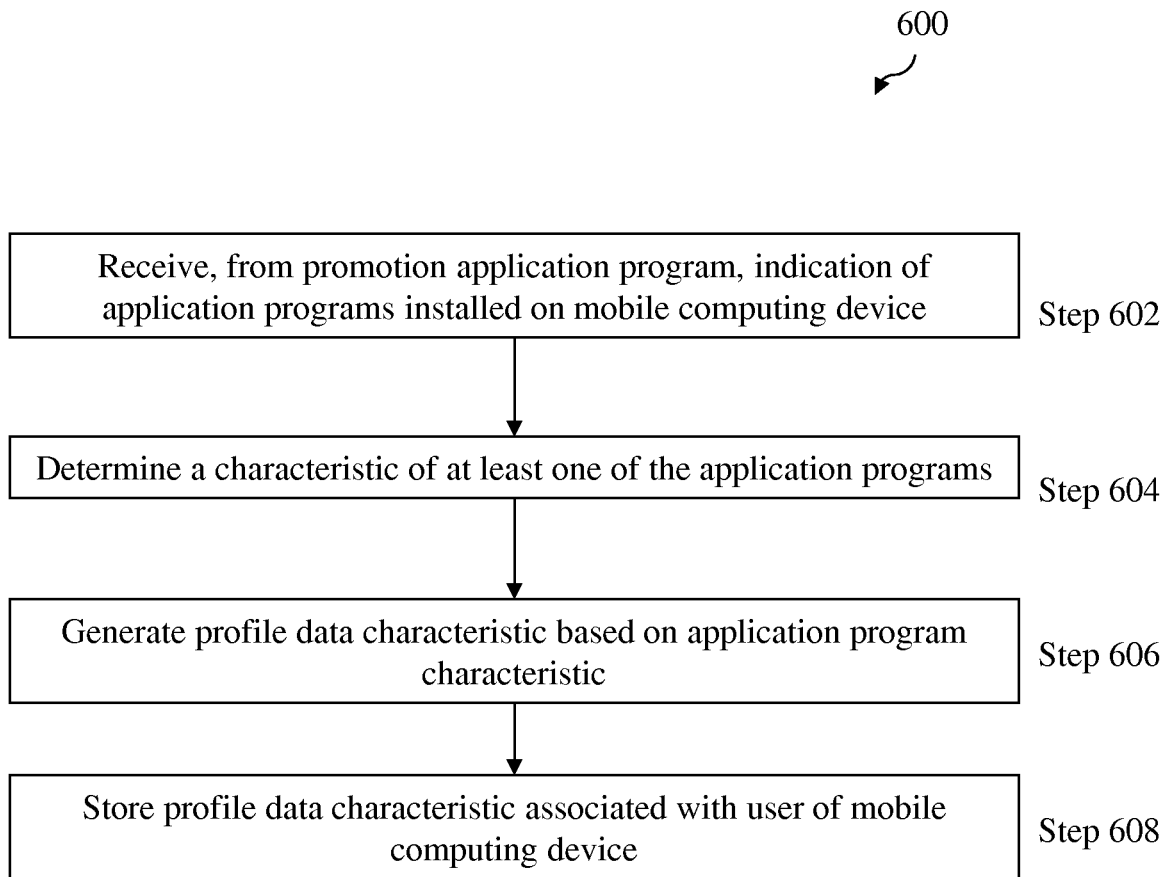
FIG. 6 is a flowchart illustrating an exemplary computer-executable method for programmatically generating one or more consumer profile data characteristics based on one or more application programs installed on a mobile computing device used by the user of the device.

FIG. 6 is a flowchart illustrating an exemplary computer-executable method 600 for programmatically generating one or more consumer profile data characteristics based on one or more application programs installed on a mobile computing device used by a consumer. In step 602, a computing device associated with a promotion and marketing service may receive an indication of one or more application programs installed on a mobile computing device associated with a consumer. The indication of the application programs may be received from a promotion application program associated with the promotion and marketing service and running on the mobile computing device. In step 604, the computing device may determine a characteristic of at least one of the application programs installed on the computing device.

Figure 7:
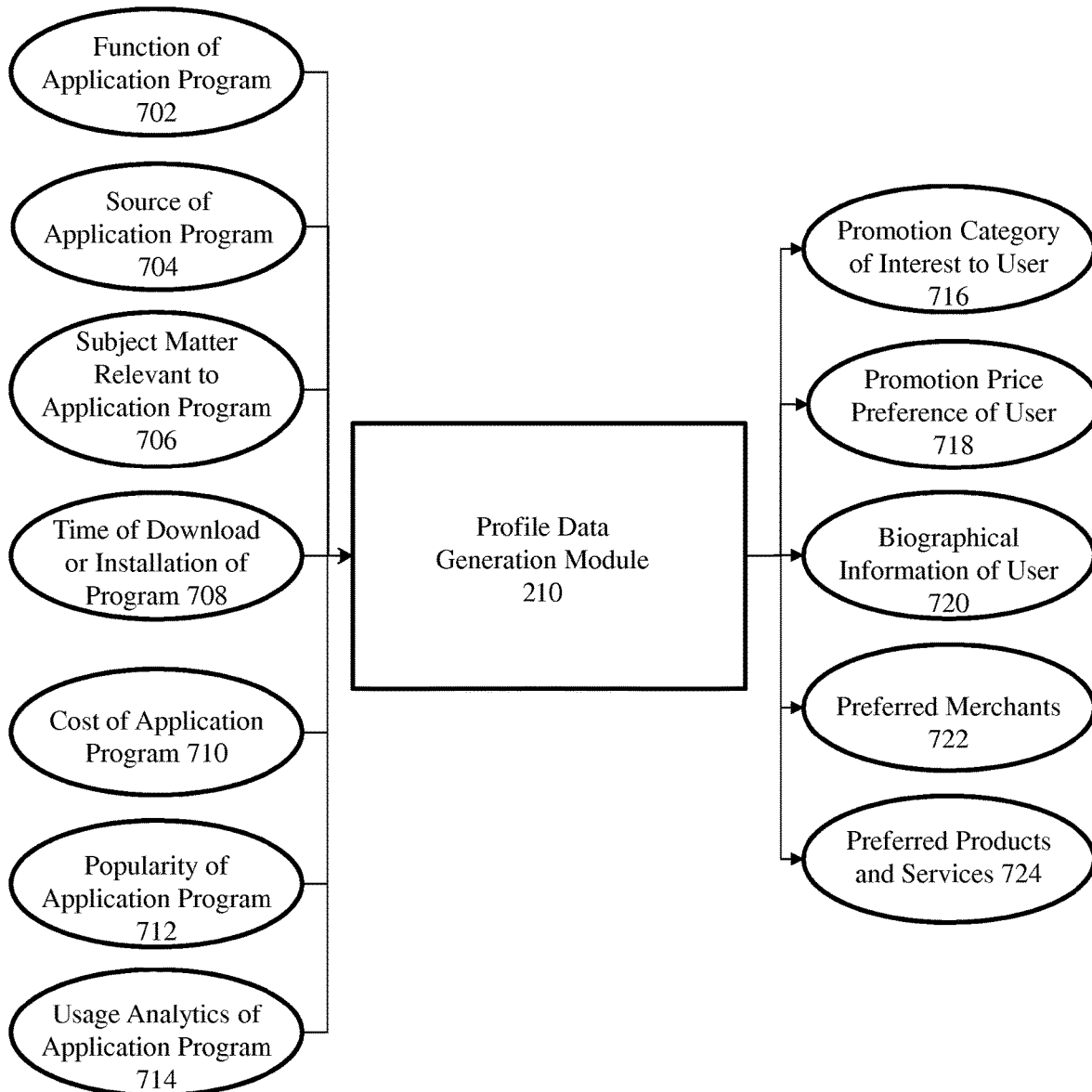
FIG. 7 is a block diagram of a module of a computing device configured for determining profile data characteristics of a consumer.

As illustrated in FIG. 7, exemplary characteristics of application programs may include, but are not limited to, a functionality or operation of the application program 702 (e.g., a stock purchase program), a source of the application program 704 (e.g., a specific social networking website), a subject matter relevant to the application program 706 (e.g., outdoors), a time of download or installation of the application program onto the mobile computing device 708, a cost of the application program 710 (e.g., free or paid), an indication of the popularity of the application program 712, usage analytics 714 of the application program on the mobile computing device (e.g., how frequently the program is used), and the like.

Returning to FIG. 6, in step 606, based on the characteristics of the application programs installed on the mobile computing device, one or more profile data characteristics may be programmatically generated for the user of the mobile computing device. As illustrated in FIG. 7, a profile data generation module 210 may generate exemplary profile data characteristics including, but not limited to, a category of promotions of interest 716 (e.g., outdoor promotions), a promotion price preference 718 (e.g., below $100), biographical information on the user 720 (e.g., occupation, location), a preferred merchant 722 (e.g., Starbucks for coffee), a preferred product or service 724 (e.g., olive oil rather than soybean oil), and the like.

In one example, a single characteristic of a single application program may be used to generate a single profile data characteristic. In other examples, multiple characteristics of multiple application programs may be used to generate a single profile data characteristic. For example, a first characteristic of a first application program and a second characteristic of a second application program my be used to generate a single profile data characteristic. In other embodiments, multiple characteristics of multiple application programs may be used to generate multiple profile data characteristics. For example, a first characteristic of a first application program may be used to generate a first profile data characteristic, while a second characteristic of a second application program may be used to generate a second profile data characteristic.

In one embodiment, the promotion application program may determine a first characteristic of a first application program installed on the mobile computing device, and generate a first profile data characteristic of the user based on the first characteristic. The promotion application program may, subsequently, determine a second characteristic of a second application program installed on the mobile computing device. The promotion application program may update the first profile data characteristic based on the second characteristic of the second application program or determine that the first profile data characteristic should remain the same. In this manner, the promotion application program is enabled to develop and update a profile for the user based on an updated list of application programs installed on the mobile computing device. In some embodiments, a promotion and marketing service may use the user profile data to determine promotions to recommend or not to recommend to a user.

Figure 8A:
FIGS. 8A-8C illustrate certain exemplary categories of application programs. Any trademarks or services marks shown in FIGS. 8A-8C are the property of their respective owners.
Figure 8B:
Figure 8C:

In certain embodiments, the user of the mobile computing device may be assigned a consumer category based on one or more application programs installed on the mobile computing device. A consumer category may indicate any suitable generalized characteristic of the user to facilitate recommendations of promotions to the user. As illustrated in a non-limiting manner in FIG. 8A, if the user's mobile computing device is determined to have installed application programs for celebrity magazines and tabloids, the user may be categorized as a "celebs and style lover." Accordingly, in some embodiments, the promotion and marketing service may recommend (or assign higher promotion scores to) promotions relevant to style, fashion and celebrity news and events to the user. As another example, illustrated in FIG. 8B, if the user's mobile computing device is determined to have installed application programs for outdoor activities, the user may be categorized as "outdoorsy." Accordingly, in some embodiments, the promotion and marketing service may recommend (or assign higher promotion scores to) promotions relevant to outdoor activities and events. As another example, illustrated in FIG. 8C, if the user's mobile computing device is determined to have installed application programs for financial news and transactions, the user may be categorized as a "financial whiz." Accordingly, in some embodiments, the promotion and marketing service may recommend (or assign higher promotion scores to) promotions relevant to financial, investment and other money-related activities.

As another example, if the user's mobile computing device is determined to have installed an application program for a rental car service (e.g., a Zip Car application program as detected by the promotion application program from a zipcar:// link), the user may be categorized as not owning a car. Accordingly, in some embodiments, the promotion and marketing service may not recommend (or assign lower promotion scores to) automobile-related promotions to the user. As another example, if the user's mobile computing device is determined to have installed an application program for senior citizens (e.g., an AARP application program), the user may be categorized as a senior citizen. As another example, if the user's mobile computing device is determined to have installed an application program for an Internet music streaming service (e.g., a Pandora Radio application program as detected by the promotion application program from a pandora:// link), the user may be categorized as interested in music discovery. As another example, if the user's mobile computing device is determined to have installed an application program for a social media dashboard (e.g., a Hootsuite application program as detected by the promotion application program from an owly:// link), the user may be determined to manage social media accounts, possibly for a business or organization. As another example, if the user's mobile computing device is determined to have installed an application program for an online dating service (e.g., an okcupid application program as detected by the promotion application program from an okcupid:// link), the user may be determined to be actively looking to date. As another example, if the user's mobile computing device is determined to have installed an application program for a conservative publication (e.g., a National Review application program as detected by the promotion application program from a nrvwapp:// link), the user may be determined to most likely be politically conservative. As another example, if the user's mobile computing device is determined to have installed an application program for sport training (e.g., a Golf Put Pro application program as detected by the promotion application program from a npu379038275:// link), the user may be determined to be an enthusiast of the sport but in need of training.

As another example, if the user's mobile computing device is determined to have installed an application program for a discounted technology sale service (e.g., a New Egg application program as detected by the promotion application program from a New Egg http:// link), the user may be determined to be interested in discount technology promotions. As another example, if the user's mobile computing device is determined to have installed an application program for religious services (e.g., a Muslim Pro application program as detected by the promotion application program from a muslimpro:// link), the user may be determined to most likely subscribe to that religion. As another example, if the user's mobile computing device is determined to have installed an application program for live music (e.g., a Live Nation application program as detected by the promotion application program from a Livenation:// link), the user may be determined to be interested in live events and entertainment. As another example, if the user's mobile computing device is determined to have installed an application program for new technology sales (e.g., a Layar Augmented Reality application program as detected by the promotion application program from a layar:// link), the user may be determined to be an early technology adopter.

In some cases, the promotion application program may determine user profile data based on the presence or absence of one or more application programs and also based on known user profile data items. As one example, if the user's mobile computing device is determined to have installed a real estate application program for a first city whereas the user's geographical location indicates that he resides in a second city, it may be determined that the user is looking to move or to purchase real estate in a different city.

As an example of determining user profile data based on the presence of multiple application programs, if a user's mobile computing device is determined to have installed a pregnancy tracking application program, the user may be determined to be trying to have a child. Additionally, if the user's mobile computing device is determined to have installed a rental car application program, then the user may be determined to not be a car owner. Since many new parents look to purchasing cars or vans, the promotion and marketing service may specifically recommend promotions for vans or related services to the user.

As another example, if a user's mobile computing device is determined to have installed an application program for a high-priced department store (e.g., a Nordstrom application program as detected by the promotion application program from a Nordstrom:// link), and if the user's mobile computing device is determined to not have installed any application programs for low-priced department stores (e.g., a Walmart application program as determined by the promotion application program from a walmart:// link or a Target application program as detected by the promotion application program from a target:// link), then the user may be determined to have a high income level. Accordingly, in some cases, higher price point promotions may be recommended to the user, and bargain basement promotions may be withheld.

As another example, if a user's mobile computing device is determined to have installed a fashion magazine application program (e.g., a Gentlemen's Quarterly application program as detected by the promotion application program from a gq:// link) and if the mobile computing device is also determined to have installed a travel-related application program (e.g., a Hotels Tonight application program detected by the promotion application program from a hotelstonight:// link), then the user may be determined to be interested in last-minute travel promotions in which style and fashion are taken into account.

As another example, if a user's mobile computing device is determined to have installed a movie streaming application program (e.g., a Netflix application program as detected by the promotion application program from a nflx:// link) and a premium travel service application program (e.g., an Uber application program in a luxury car market as detected by the promotion application program from an uber:// link), then it may be determined that the user already pays for premium content and/or subscribes to luxury services. In this case, if the user's mobile computing service is determined to not have any music streaming application program installed thereon, a premium membership promotion for the same may be offered.

The absence of one or more application programs from a user's mobile computing device may also be used by the promotion application program to determine user profile data. For example, if a user's mobile computing device has installed application programs for two out of three competing car rental services, then it may be determined that the user does not value the third service. In this case, it may also be determined that the third service typically has less value to car renters.

Returning to FIG. 6, in step 608, the generated profile data characteristics may be stored in association with an identity of the user of the mobile computing device.

In certain embodiments, one or more of the steps illustrated in FIG. 6 may be performed on the mobile computing device running the promotion application program or on a computing device remote from the mobile computing device (e.g., a device associated with the promotion and marketing service). The profile data characteristics of the user may be stored in a non-transitory storage device on or coupled to the mobile computing device and/or a non-transitory storage device on or coupled to a remote computing device associated with the promotion and marketing service.

In certain non-limiting embodiments, the promotion application program may automatically modify its design, structure, displayed content and/or function based on user profile data determined by the promotion application program and/or based on the application programs detected by the promotion application program. For example, if it is determined that the user is a senior citizen (based on the presence of an application program for senior citizens), then the user interface of the promotion application program may be modified automatically to be more readable for senior citizens, e.g., by increasing the font and image sizes and/or by enlarging the touchable areas on the interface. As another example, if it is determined that the user is mainly interested in travel (based on the presence of mainly travel-related application programs), then the user interface of the promotion application program may automatically reconfigure to display only travel-related information and promotions or to highlight travel-related information and promotions (e.g., by listing this information at the top).

Figure 9:
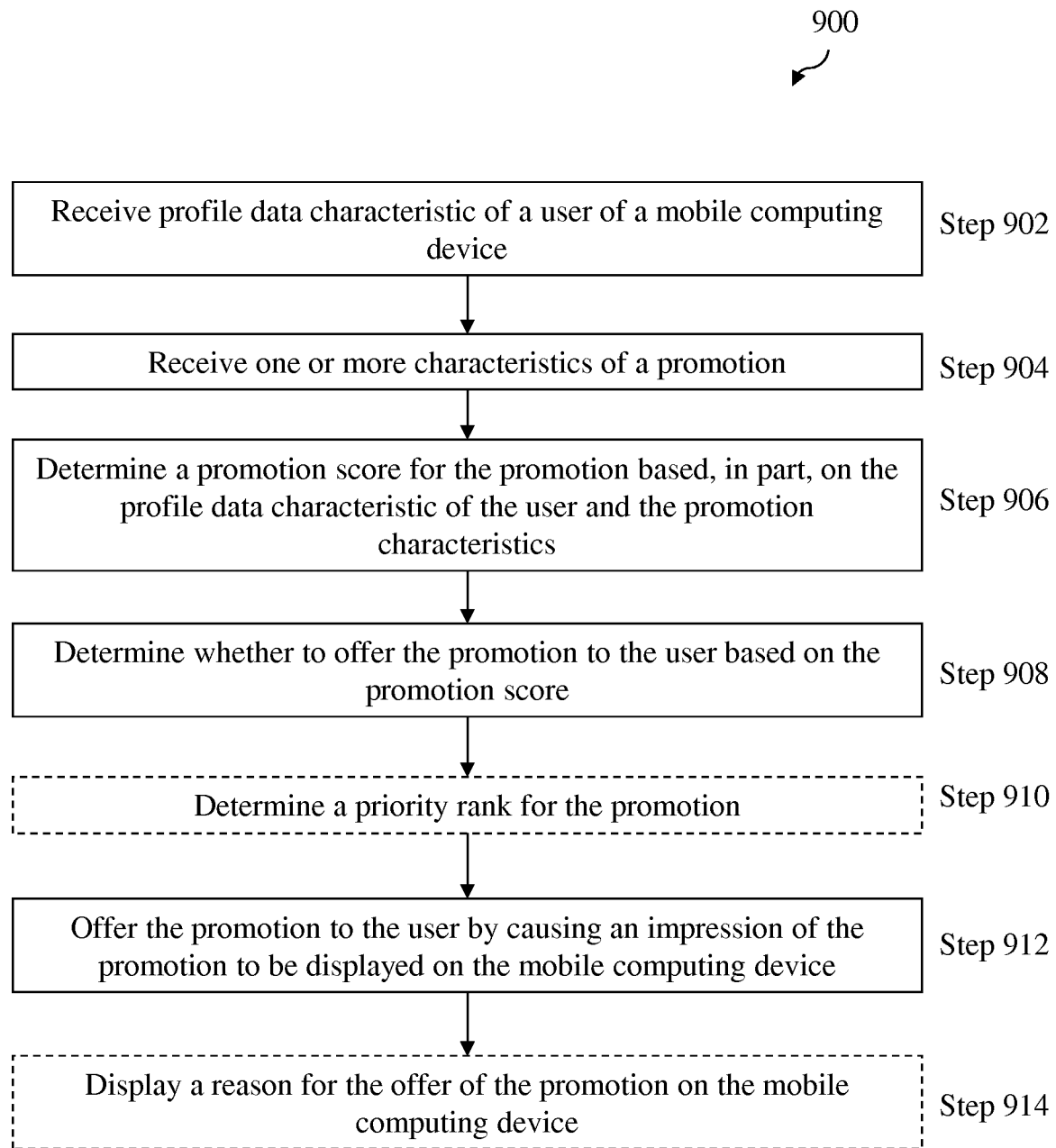
FIG. 9 is a flowchart illustrating an exemplary computer-executable method for using the generated profile data characteristics of a user of a mobile computing device in providing impressions of promotions to the user.

FIG. 9 is a flowchart illustrating an exemplary computer-executable method 900 for using the generated profile data characteristics of the user of the mobile computing device in providing impressions of promotions to the same user. In step 902, the profile data characteristics may be received or programmatically generated at a computing device. In step 904, one or more characteristics of an available promotion may be received, for example, the price, subject matter, merchant, and the like. In step 906, a promotion score may be programmatically generated for the promotion based, in part, on the profile data characteristics of the user and the promotion characteristics. In one embodiment, a promotion score generation module may assign a promotion score to the promotion based on the promotion characteristics, the consumer profile data, the stored consumer activity data, and at least one of (i) current consumer activity data, (ii) current local context data, and/or (iii) predicted consumer activity data, may be taken into account.

In step 908, the computing device may determine whether to offer the promotion to the user based on the promotion score. In some embodiments, only those promotions whose promotion scores exceed a predetermined threshold value may be offered. In some cases, the predetermined threshold value for the promotion scores may be specific to the category or type of a promotion. In some cases, the predetermined threshold value for the promotion score may be specific to a consumer segment or group. For example, for consumers who use the promotion and marketing service infrequently, the predetermined threshold value may be set to a higher value than for more active consumers.

In step 910, in some embodiments, upon determining that the promotion should be offered to the user of the mobile computing device, the promotion may be ranked within a plurality of promotions based on its promotion score.

In step 912, the promotion may be offered to the user of the mobile computing device by causing an impression to be generated on a consumer interface associated with the user, for example, on a user interface associated with a promotion application program installed on the mobile computing device.

In step 914, in some embodiments, a reason may be provided as to why the promotion is particularly recommended for the consumer. The reason may indicate, in some embodiments, one or more other application programs installed on the mobile computing device that were considered in generating the promotion.

In certain embodiments, one or more of the steps illustrated in FIG. 9 may be performed on the mobile computing device running the promotion application program or on a computing device remote from the mobile computing device (e.g., a device associated with the promotion and marketing service). The profile data characteristics of the user may be stored in a non-transitory storage device on or coupled to the mobile computing device and/or a non-transitory storage device on or coupled to a remote computing device associated with the promotion and marketing service.

In certain embodiments, a profile data characteristic of the mobile computing device user may be used to determine or adjust a number of promotions having a certain characteristic offered to the user. For example, if the user is determined to be interested in the outdoors, then a larger number of promotions for outdoor events and activities may be provided to the user. Similarly, one or more characteristics of the application programs installed on the mobile computing device may be used to determine or adjust a number of promotions having a certain characteristic offered to the user. For example, if one or more financial application programs are determined to be newly installed on the mobile computing device, then promotions related to finance and investing may be provided to the user for the first time.

Conversely, in certain embodiments, a profile data characteristic of the user or one or more characteristics of the application programs installed or uninstalled on the mobile computing device may be used to reduce the number of promotions having a certain characteristic that are provided to the user. For example, if a profile data characteristic indicates that the user is interested in health and nutrition, then promotions in a "fast food" category may not be provided to the user.

The promotion application program may determine or adjust the promotions provided to a user based on one or more application programs that were previously installed but are currently uninstalled from the mobile computing device. This may be determined by comparing an updated list of installed application programs (i.e., snapshots of installed application programs) over time. For example, if it is determined that the user uninstalled an application program on healthy eating, then promotions in a "fast food" category may be introduced to the user.

In certain embodiments, the promotion application program may determine or adjust promotions offered to a user based on the time period within which one or more application programs were installed on the mobile computing device or uninstalled from the mobile computing device. The number of promotions having a certain characteristic that are provided to the user may also be adjusted based on the time period. For example, if it is determined that a health-related application program was recently installed on the mobile computing device (that is, within a predetermined time period, e.g., within hours, days or weeks), this may indicate that the user currently has a high level of interest in health-related matters. This information may be used by the promotion application program to provide a higher number of health-related promotions than would be offered if the health-related application program were installed before the predetermined time period. As another example, if it is determined that an application program from the Kayak travel website was recently downloaded (e.g., within hours, days or weeks) to the mobile computing device, then the promotion application program may increase the number of travel-related promotions targeted to the user. As another example, if it is determined that an application program from the Nordstrom retail store was recently deleted (e.g., within hours, days or weeks) from the mobile computing device, then the promotion application program may decrease the frequency of clothing-related promotions targeted to the user. As another example, if it is determined that the user uninstalled an application program after a certain predetermined time period (e.g., one year), it may be determined that the user is dissatisfied with the service or no longer finds it useful.

In certain embodiments, the promotion application program may determine or adjust promotions offered to a user based on the number of other application programs installed on the mobile computing device. For example, if a large number of application programs is installed on the user's mobile computing device, the promotion application program may determine that the user is an experienced application program user and may customize promotion recommendations accordingly by, for example, increasing the number of promotions offered.

In certain embodiments, the promotion application program may determine or adjust promotions offered to a user based on one or more computer processes running on the mobile computing device. In one example, the identity of the computing processes may be detected and associated with one or more application programs installed on the mobile computing device. The identity of the application programs may be used to determine promotions to be offered to the user as disclosed herein.

Figure 10:
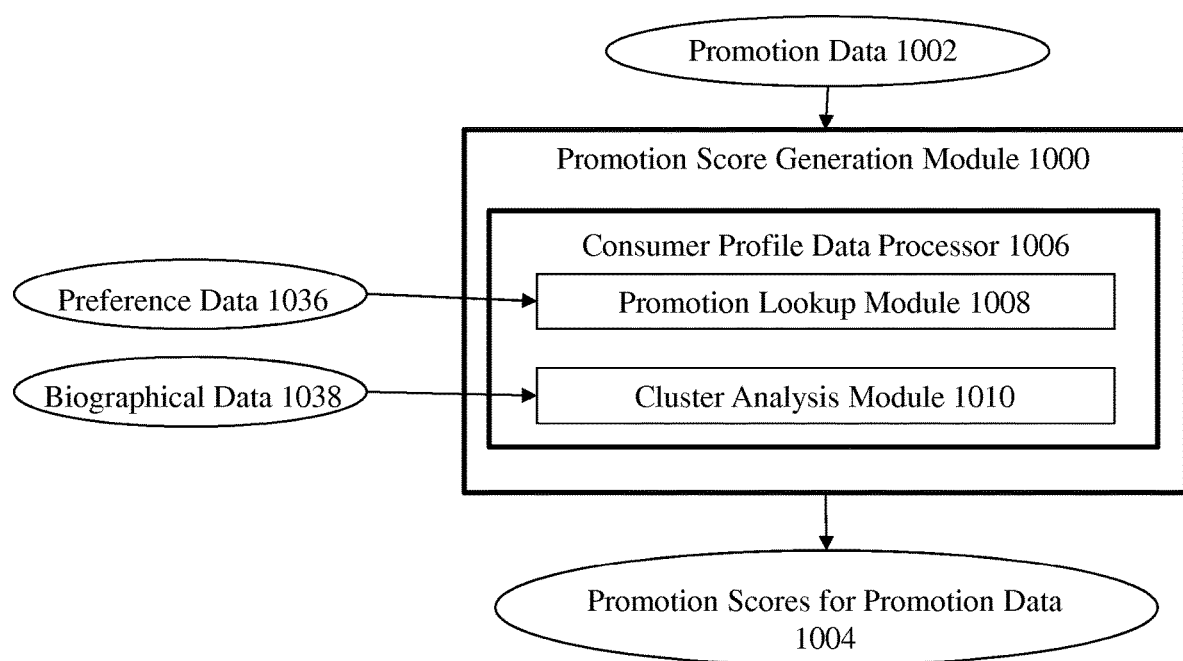
FIG. 10 is a block diagram illustrating exemplary computer processing units or devices that may be implemented in a promotion score generation module implemented by a promotion and marketing service.

FIG. 10 is a block diagram illustrating exemplary processing units or devices that may be implemented in a promotion score generation module 1000 implemented by a promotion and marketing service. The promotion score generation module 1000 may take as input promotion data 1002 and data associated with one or more consumers, and may output promotion scores 1004 for at least a subset of the promotions.

An exemplary promotion score generation module 1000 may include a single processing unit or a plurality of processing units configured to process and analyze different types of consumer information and to relate the consumer information to the promotion data. The promotion data 1002 may be provided as input to each of the processing units. In some embodiments, a score or weight may be assigned to each promotion based on the analysis of each type of input data. The analysis of the input data may be performed by computer-executable instructions that may perform rule-based analysis, statistical analysis, machine learning analysis, and the like. The score or weight assigned to a promotion may indicate or be a measure of how relevant the promotion is to a consumer based on the specific input data used by the processing unit. For example, a first score or weight may be assigned to a promotion based on the analysis of the consumer profile data, a second score or weight may be assigned to the promotion based on the analysis of the current local context data, a third score or weight may be assigned to the promotion based on the analysis of the current consumer activity data, a fourth score or weight may be assigned to the promotion based on the analysis of the predicted consumer activity data, a fifth score or weight may be assigned to the promotion based on the analysis of the stored consumer activity data, and the like. The plurality of scores or weights generated may be combined in any suitable way to generate an overall promotion score for each promotion. Fewer or more scores or weights than those described herein may be used in generating an overall promotion score for a promotion.

In some exemplary embodiments, the promotion score generation module 1000 may assign a score to a promotion based partly on promotion data associated with the promotion. For example, if a promotion has very limited availability or if there is a short time deadline for purchasing or redeeming a promotion, then that promotion may be assigned a higher score to indicate an urgency with which the consumer should be notified of the promotion. As another example, transactional impressions (i.e., impressions generated based on prior consumer interaction with a promotion, such as shipping confirmation impressions) may be assigned a higher score than non-transactional impressions.

As illustrated in FIG. 10, an exemplary promotion score generation module 1000 may include a consumer profile data processor 1006 configured to process and analyze the consumer profile data with respect to aspects of each promotion. In an exemplary embodiment, consumer preference data 1036 included in the consumer profile data (e.g., a locational preference for promotions, a merchant preference for promotions, an instrument preference for promotions, a category and/or sub-category preference for promotions, a price preference for promotions, etc.) may be directly compared to aspects of the promotions using a promotion lookup module 1008. Consumer preference data 1036 includes data that relate directly to aspects of promotions and that can be directly compared to aspects of promotions. For example, if a consumer prefers to purchase promotions from Merchant M, then the promotion lookup module 1008 may determine if any of the available promotions originate at Merchant M. If so, the promotion lookup module 1008 may provide a high score to such promotions to indicate that the consumer is likely to purchase these promotions. The promotions not originating at Merchant M may be assigned lower scores or may not be assigned scores in certain embodiments.

In an exemplary embodiment, consumer biographical data 1038 included in the consumer profile data (e.g., age, gender, race, ethnicity, height, weight, income, residential address, etc.) may be processed and analyzed in a cluster analysis module 1010. Consumer biographical data 1038 may or may not be directly compared to aspects of promotions. For example, certain promotions may not indicate that they are suitable for a certain age or gender. As such, the cluster analysis module 1010 may employ computer-executable instructions configured to process and analyze promotion purchase patterns associated with a plurality of consumers who share one or more common consumer biographical data items with the specific consumer to whom a promotion impression will be provided.

In other words, a plurality of consumers may be defined as a cohort of the specific consumer based on one or more consumer biographical data items, for example, consumers who are in the same age range as the specific consumer, consumers who are the same gender as the specific consumer, consumers who reside in the same geographical area as the specific consumer, and the like. The promotion purchase patterns of this cohort may then be analyzed to determine whether the specific consumer is likely to purchase each of the promotions indicated in the promotion data 1002. The implicit notion is that consumers with shared biographical characteristics are likely to have similar interests in promotions and similar purchase patterns. For example, consumers in a teenage cohort are less likely to purchase alcohol and tobacco. The cluster analysis module 1010 may implement any suitable technique including, but not limited to, statistical analysis, machine learning, and the like.

The cluster analysis module 1010 illustrated in FIG. 10 may implement a statistical analysis technique in certain exemplary embodiments. For example, input data may be fed into a statistical software, such as JMP from SAS, from which the probability of the consumers purchasing each promotion may be outputted. A promotion score that is proportional to the generated probability value may be assigned to each promotion.

The cluster analysis module 1010 illustrated in FIG. 10 may implement a machine learning technique in certain exemplary embodiments.

In an exemplary embodiment, a predictive model may be programmatically generated by analyzing certain aspects or features of each promotion for each consumer that are useful for predicting the probability that the consumer will purchase the promotion. Exemplary promotion features used may include, but are not limited to, geographical proximity to the consumer, price, previous viewing or purchase activity performed by the consumer for the promotion category, and the like. The promotion features may be programmatically retrieved from the historical database 110 in some embodiments. The promotion features may be used to programmatically generate a predictive model for outputting purchase probabilities. The predictive model may be generated using, for example, a learning method like random forests. The generated predictive model may be used to compute, in real-time without any intentional delay, the predicted purchase probability per promotion for each consumer. The promotions may be ranked in descending order of their predicted purchase probabilities. Promotion scores may be determined based on the predicted purchase probabilities.

III. Incentivized Download of Application Programs

In certain embodiments, a promotion application program may enable a user to download one or more additional application programs from the Internet. In some cases, the promotion application program may incentivize download of an application program by providing a promotion in conjunction with download of the application program. For example, an impression for a promotion and an application program associated with the promotion (e.g., provided by a merchant offering the promotion) may be displayed by the promotion application program. A user interface associated with the promotion application program may enable the user to indicate whether he/she wishes to purchase the promotion and/or whether he/she wishes to download the application program. This provides the user with the option of merely purchasing the promotion without downloading the application program, or downloading the application program while receiving or purchasing the promotion.

As one example, if the promotion application program determines that the mobile computing device of the user does not have installed thereon an application program provided by Lyft, the promotion application program may render a representation of the Lyft application program and also indicate that download of the Lyft application program will be rewarded with an incentive, for example, a promotion provided in the downloaded and installed Lyft application, extra Lyft credits at installation of the Lyft application program, and the like.

In some cases, the promotion application program may restrict purchase of a promotion so that the promotion may be purchased only upon download of the application program. In some cases, the representation of the application program may be presented by the promotion application program only after the impression of the promotion is selected by the user.

Figure 11:
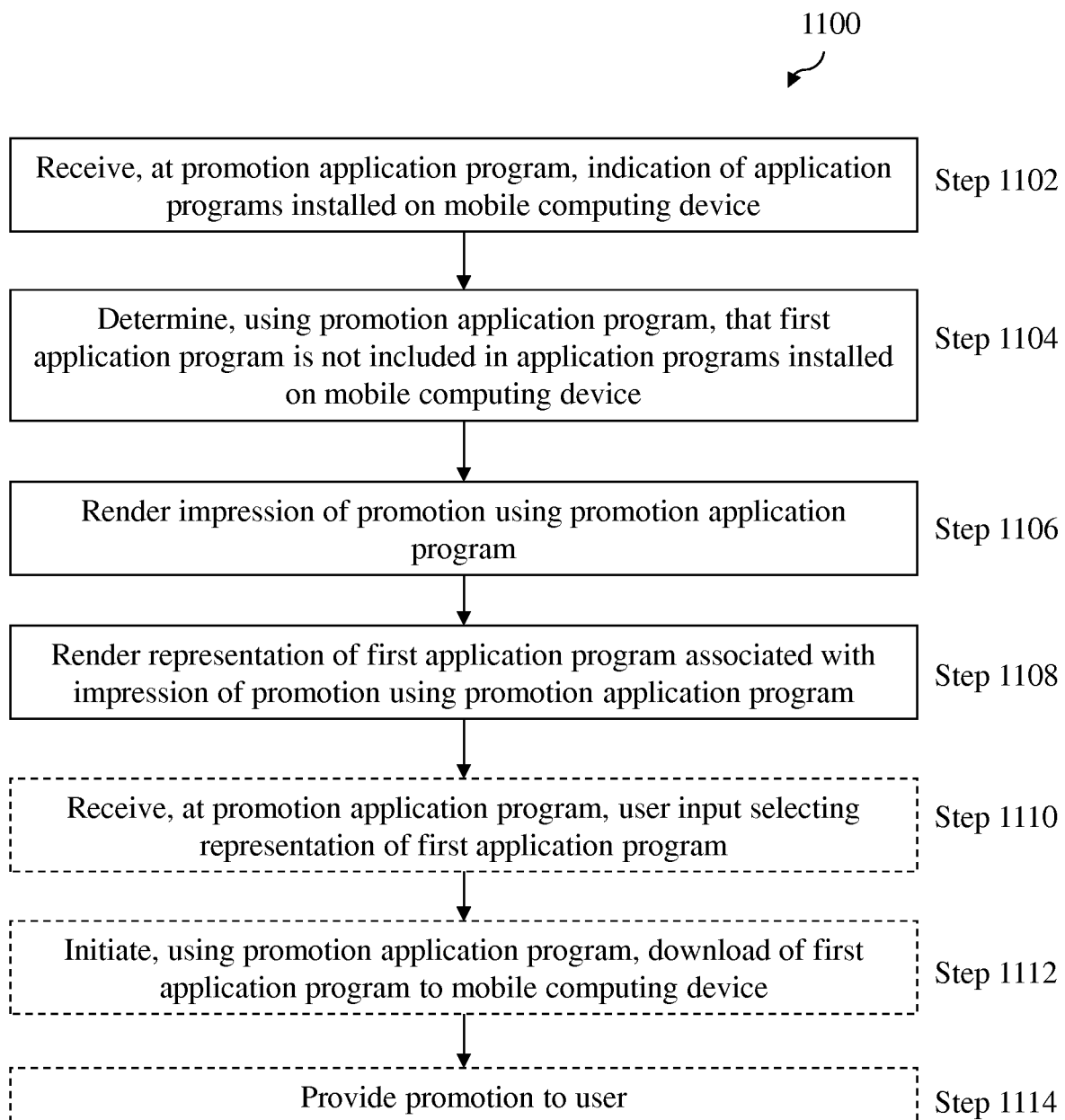
FIG. 11 is a flowchart illustrating an exemplary computer-executable method for providing an application program for download in association with a promotion.

FIG. 11 is a flowchart illustrating an exemplary computer-executable method 1100 for providing an application program for download in association with a promotion. In step 1102, a promotion application program installed on a mobile computing device may receive an indication of other application programs installed on the mobile computing device. Any of the exemplary techniques for detecting application programs disclosed herein may be used.

In step 1104, the promotion application program may determine whether a specific first application program is not included in the list of application programs installed on the mobile computing device. This may be accomplished by comparing an identification of the first application program to the list of application programs. Upon determining that the first application program is not included in the list of installed application programs, in step 1106, the promotion application program may render an impression of a promotion on the mobile computing device, where the promotion is associated with the first application program (e.g., provided by the same merchant). In step 1108, the promotion application program may render a representation of the first application program on the mobile computing device in association with the impression of the promotion. The representation of the first application program may be configured to enable, upon user selection of the representation, download of the first application program from the Internet onto the mobile computing device. In some cases, the promotion application program may indicate that download of the first application program will be rewarded with the promotion.

In contrast, if the first application program were determined to be included in the list of installed application programs, then the representation of the first application program would not be presented in step 1108 as there would be no need to install the first application program. In this case, the promotion associated with the first application program would also not be represented by the promotion application program as there would be no need for an incentivized download of the first application program.

[00151] In step 1110, the promotion application program may receive user input indicating that the user wishes to download the first application program (e.g., by selecting the representation of the first application program). In step 1112, in response, the promotion application program may automatically initiate download of the first application program onto the mobile computing device by, for example, transmitting a request to a remote computing server storing computer-executable instructions for the first application program. In some cases, in step 1114, the promotion application program may automatically provide the promotion associated with the first application program to the user of the mobile computing device or may allow purchase of the promotion as a reward for the download of the first application program.

In some cases, the promotion application program may enable purchase of the promotion by the user without download of the first application program. Upon receipt of user input indicating that the user wishes to purchase the promotion (e.g., by selecting the impression of the promotion), the promotion application program may enable purchase of the promotion by, for example, transmitting a request to a promotion and marketing service for the promotion.

In some cases, upon download or installation of the first application program, the promotion application program may render an impression of the promotion either in a user interface associated with the promotion application program and/or in a user interface associated with the first application program.

Figure 12A:
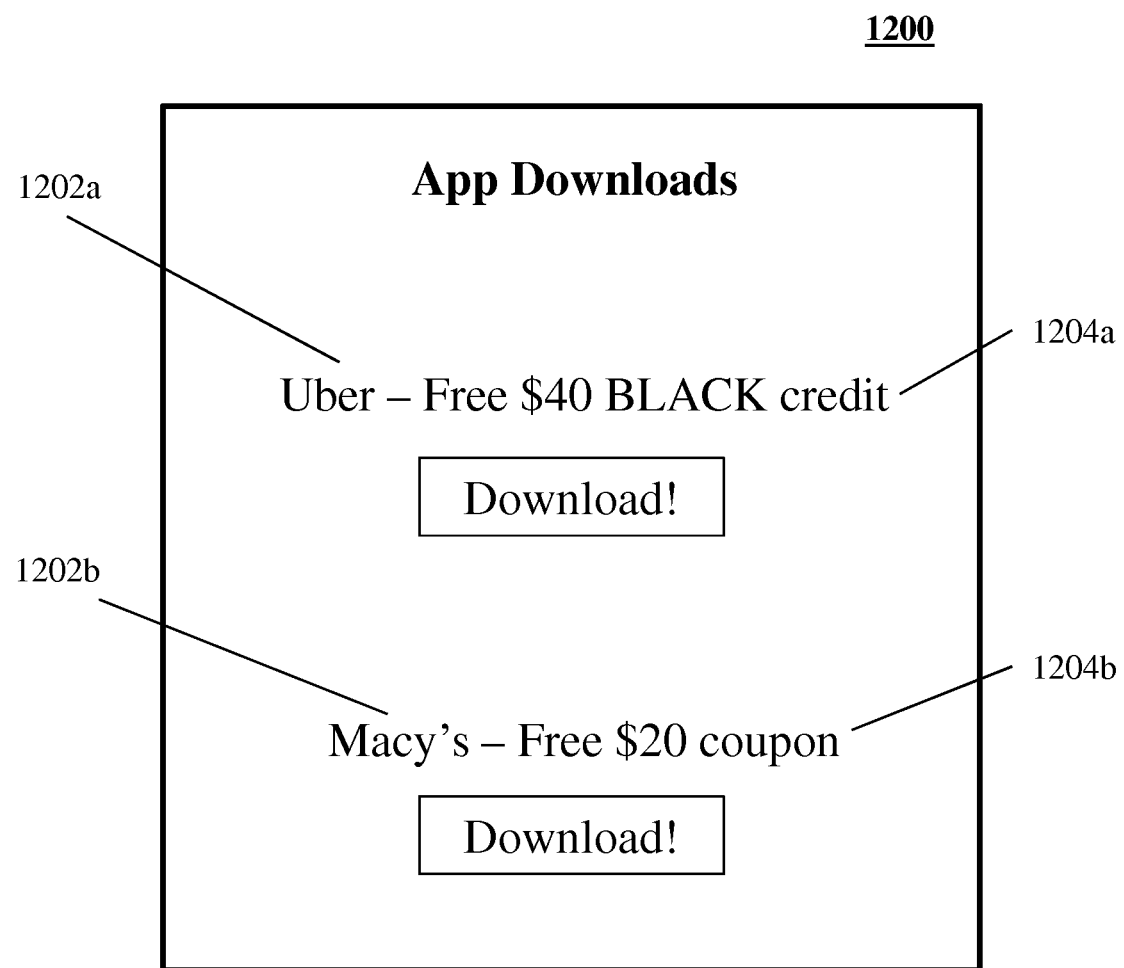
FIG. 12A is an exemplary user interface rendered by a promotion application program to enable download of an application program.

FIG. 12A is an exemplary user interface 1200 rendered by a promotion application program to enable download of an application program. User interface 1200 may display representations 1202a-1202b of exemplary application programs that may be downloaded. User interface 1200 also displays impressions 1204a-1204b of promotions associated with the application programs to indicate that download of an application program is incentivized by a corresponding promotion.

Figure 12B:
FIG. 12B is an exemplary user interface rendered after download of an application program.

FIG. 12B is an exemplary user interface 1250 rendered by an application program 1202a after its download. The user interface 1250 may provide a corresponding promotion 1204a to the user automatically upon launch.

In certain exemplary embodiments, the promotion application program may enable corporate entities to compete in incentivizing downloads of their corresponding application programs. For example, if the mobile computing device has installed thereon an application program provided by Macy's, the promotion application program may enable competitors of Macy's (e.g., Nordstrom) to bid to have their application programs installed on the mobile computing device. In one embodiment, the promotion application program may determine that a first application program associated with a first merchant is installed on the mobile computing device, and that a second application program associated with a second merchant is not installed on the mobile computing device. In one case, the promotion application program may cause the mobile computing device to transmit an indication to a remote computing device associated with the second merchant to indicate that the second application program is not installed on the mobile computing device. This information may enable the second merchant to target its second application program to the mobile computing device. In one embodiment, the promotion application program may render a representation of the second application program associated with the second merchant on the mobile computing device. The representation may be configured to enable download of the second application program. In one case, to incentivize download of the second application program, the promotion application program may also render an impression of a promotion (e.g., offered by the second merchant) on the mobile computing device. Upon download of the second application program by the user, the promotion application program may provide the promotion to the user.

In certain exemplary embodiments, the promotion application program may enable merchants to target consumers using a retail merchant's application program. For example, if the mobile computing device has an application program provided by Macy's, the promotion application program may enable retail merchants selling their products through Macy's (e.g., Kelloggs, Pepsi) to target their advertising to the user. In one embodiment, the promotion application program may determine that a first application program associated with a first merchant is installed on the mobile computing device, and that a second application program associated with a second merchant (which sells products using the first merchant's store) is not installed on the mobile computing device. In one case, the promotion application program may cause the mobile computing device to transmit an indication to a remote computing device associated with the second merchant to indicate that the second application program is not installed on the mobile computing device. This information may enable the second merchant to target its second application program to the mobile computing device. In one embodiment, the promotion application program may render a representation of the second application program associated with the second merchant on the mobile computing device. The representation may be configured to enable download of the second application program. In one case, to incentivize download of the second application program, the promotion application program may also render an impression of a promotion (e.g., offered by the second merchant) on the mobile computing device. Upon download of the second application program by the user, the promotion application program may provide the promotion to the user.

IV. Offering Promotion Impressions Using Application Programs

In certain embodiments, a promotion and marketing service may provide a computer-executable program or tool for providing impressions of promotions. A computer-executable program or tool (e.g., software development kit) may be provided by a promotion and marketing service for incorporation in a first application program. The computer-executable tool may enable the first application program to display impressions of promotions offered by the promotion and marketing service, thereby making it unnecessary to provide a separate promotion application program for presenting promotions relevant to a merchant providing the first application program. Rather, each impression may be presented in a user interface of the first application program in association with a representation of a relevant product sold by the merchant associated with the first application program.

In one embodiment, the promotion and marketing service may host the first application program incorporating the computer-executable tool on a website to enable download of the first application program by a user of a mobile computing device. The website may indicate that the download of the first application program will enable the user to receive promotions from the promotion and marketing service. Upon download and installation of the first application program from the promotion and marketing service website, the first application program may provide the user with an incentive or reward for the download. The incentive may be a promotion in some cases.

The first application program may or may not be provided by or be related to the promotion and marketing service. For example, the first application program may be provided by a retail merchant (e.g., Macy's), while the computer-executable tool may be provided by a separate promotion and marketing service that provides promotions for products sold by the retail merchant.

Figure 13:
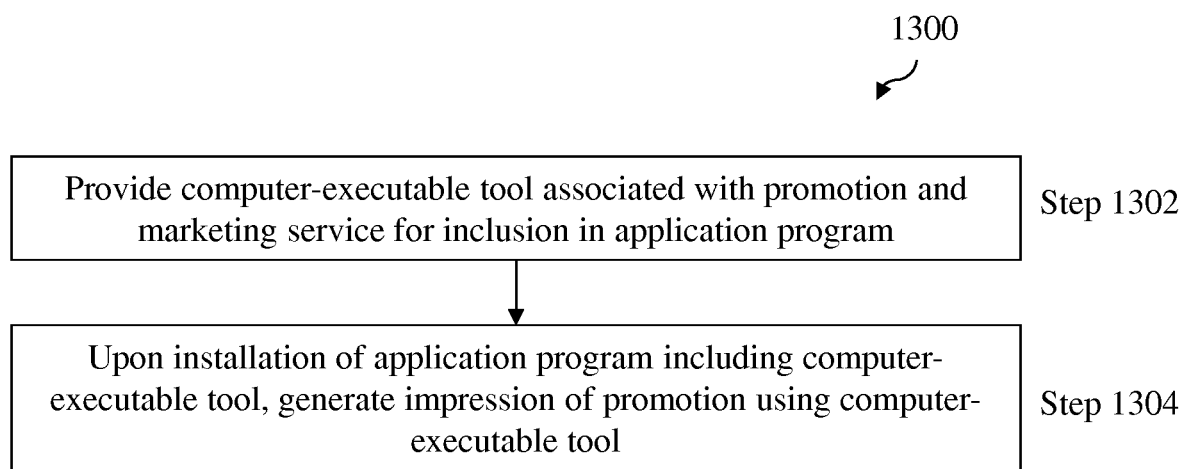
FIG. 13 is a flowchart of an exemplary computer-executable method for incentivizing download of an application program.

FIG. 13 is a flowchart of an exemplary computer-executable method 1300 for incentivizing download of an application program. In step 1302, a computer-executable program or tool associated with a promotion and marketing service may be provided for incorporation in a first application program. The first application program may or may not be provided by or associated with the promotion and marketing service. In step 1304, upon installation of the first application program on a mobile computing device, the computer-executable tool may programmatically generate an impression of a promotion provided by the promotion and marketing service. In one embodiment, the impression may be rendered on a user interface associated with the first application program.

Figure 14:
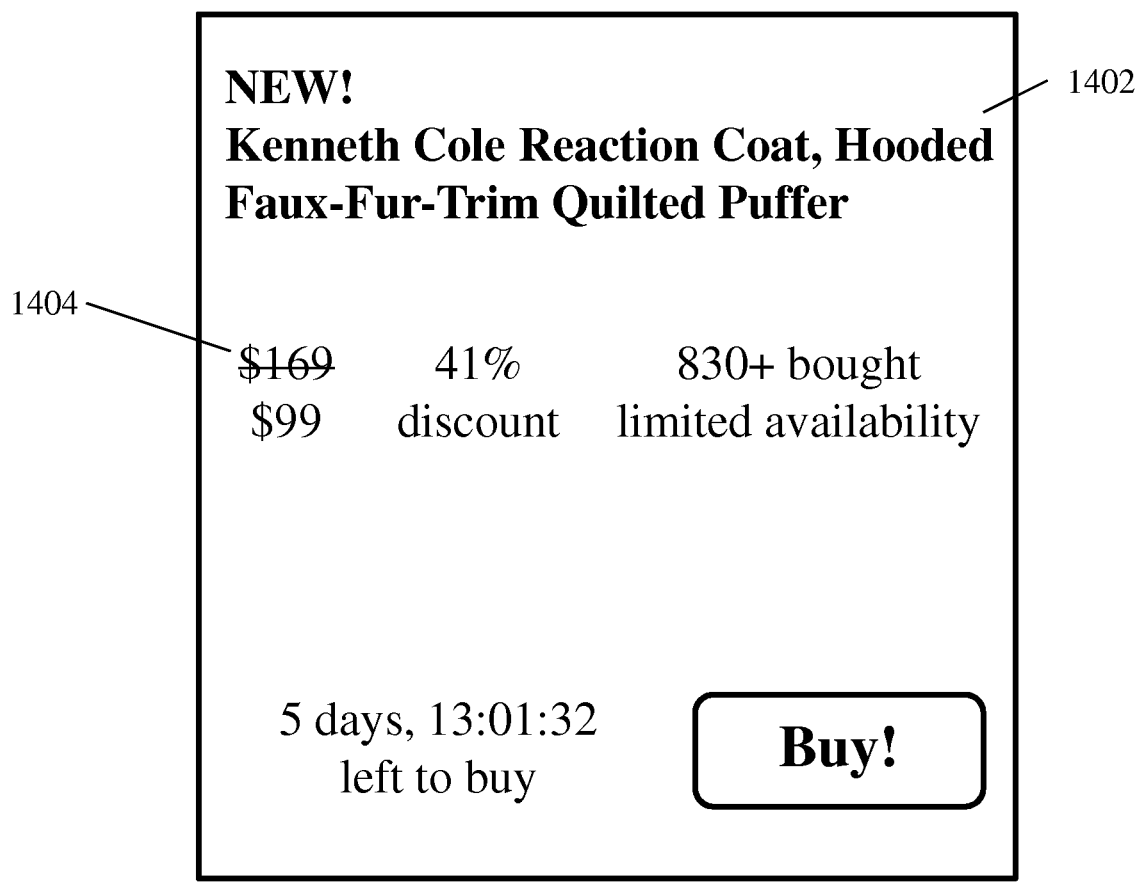
FIG. 14 illustrates an exemplary user interface provided by an application program associated with a retail merchant.

FIG. 14 illustrates an exemplary user interface 1400 provided by a first application program associated with a retail merchant. A computer-executable program or tool associated with a promotion and marketing service included in the first application program causes an impression of a promotion to be rendered on the user interface 1400 of the first application program related to a product sold by the retail merchant. For example, the user interface 1400 may present a product 1402 and a promotion 1404 providing a discount for the product. Thus, incorporating the computer-executable program or tool in the first application program enables the retail merchant to incentivize purchases with promotions. In return, in some embodiments, the promotion and marketing service may receive a payment from the retail merchant for the use of the computer-executable program or tool.

In one embodiment, the first application program associated with a retail merchant may be provided in conjunction with a promotion application program associated with a promotion and marketing service on the user's mobile computing device. In this case, an impression of a promotion rendered by the promotion application program, when selected by the user, may automatically cause the first application program to be launched at the relevant product page and with the impression rendered on the first application program as well.

V. Distribution of Promotion Application Program

In certain embodiments, a promotion and marketing service may provide a computer-executable program or tool for incorporation in an application program in order to incentivize download of a promotion application program by a user of a mobile computing device. In one embodiment, a computer-executable program or tool (e.g., software development kit) may be provided by a promotion and marketing service for incorporation in a first application program. The first application program may or may not be provided by or be related to the promotion and marketing service. For example, the first application program may be provided by a retail merchant (e.g., Macy's), while the computer-executable tool may be provided by a separate promotion and marketing service that provides promotions for products sold by the retail merchant.

The computer-executable program or tool may enable detection of whether a promotion application program is installed on the mobile computing device. Exemplary techniques for detecting application programs disclosed herein may be used. If the promotion application program is determined to not be installed on the mobile computing device, the computer-executable program or tool may incentivize download of the promotion application program. For example, the tool may render a representation of the promotion application program and an impression of a promotion on a user interface associated with the first application program. The representation of the promotion application program may be configured to, when selected, enable download of the promotion application program using the Internet. The impression of the promotion may indicate that the download will be rewarded with the promotion. Upon download of the promotion application program, the user of the mobile computing device may be provided with the promotion automatically.

In certain embodiments, the computer-executable program or tool may obtain and store information about the user's interaction with the first application program. Upon installation of the promotion application program, the program or tool may transmit the stored information for use by the promotion application program. Similarly, information from the promotion application program may be transmitted to the first application program, for example, to launch the first application program on a particular product page or with a particular promotion or user code.

Figure 15:
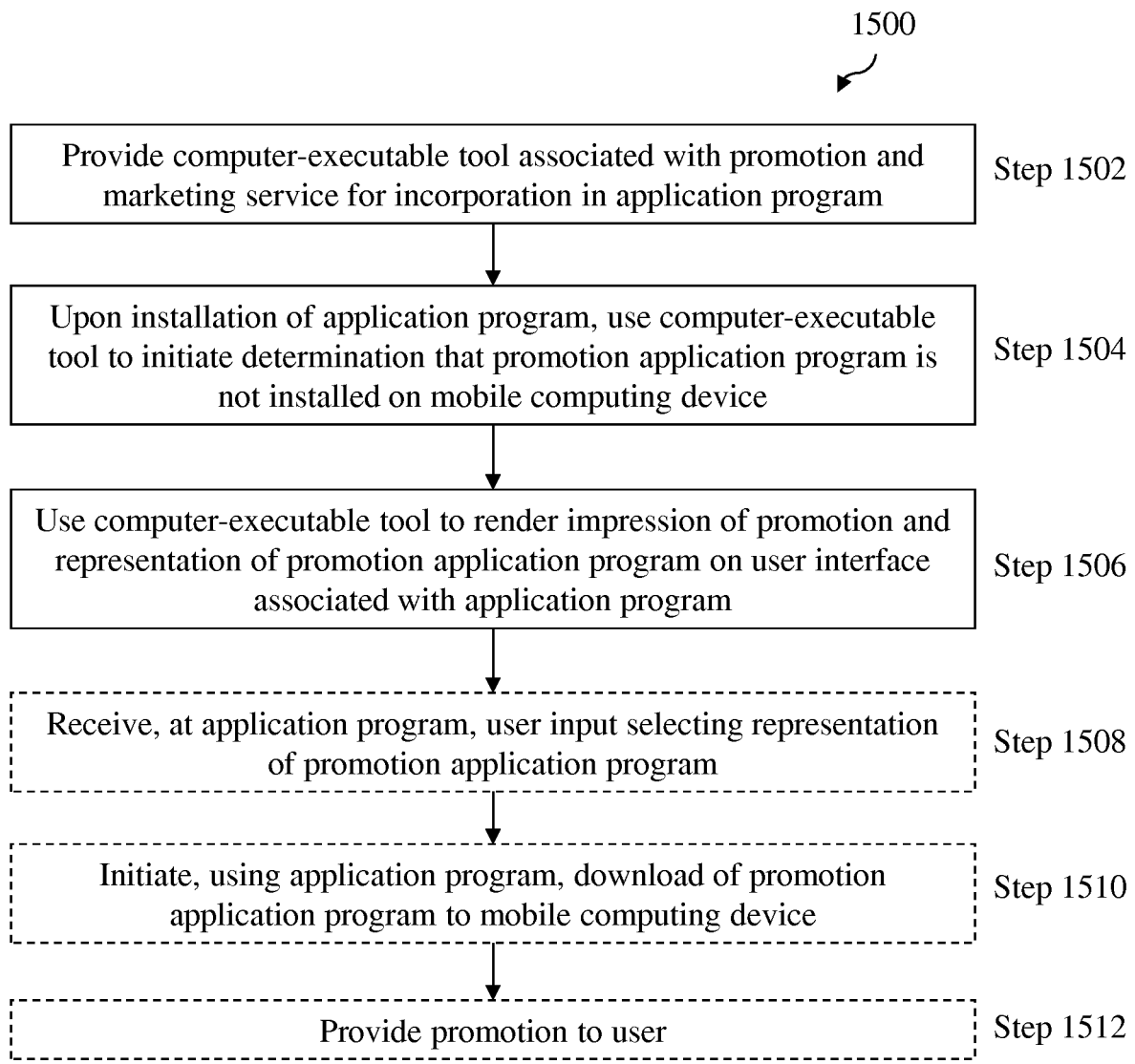
FIG. 15 is a flowchart illustrating an exemplary computer-executable method for incentivizing download of a promotion application program.

FIG. 15 is a flowchart illustrating an exemplary computer-executable method 1500 for incentivizing download of a promotion application program. In step 1502, a computer-executable program or tool may be provided by a promotion and marketing service for incorporation into a first application program. The first application program may be provided by a separate entity than the promotion and marketing service. In step 1504, upon installation of the first application program on a mobile computing device, the computer-executable program or tool may programmatically initiate a determination that a promotion application program is not installed on the mobile computing device. In step 1506, upon determining that the promotion application program is not installed, the computer-executable tool may cause an impression of a promotion and a representation of the promotion application program to be rendered in a user interface of the first application program.

In step 1508, the first application program may receive user input indicating that the user wishes to download the promotion application program (e.g., by selecting the representation of the promotion application program). In step 1510, in response, the computer-executable tool may cause the first application program to automatically initiate download of the promotion application program onto the mobile computing device by, for example, transmitting a request to a remote computing server storing computer-executable instructions for the promotion application program. In certain embodiments, the computer-executable tool may detect if the promotion application program has been downloaded or installed on the mobile computing device. Upon verification of the installation of the promotion application program, the computer-executable tool may provide the promotion to the user of the mobile computing device, in step 1512.

Figure 16:
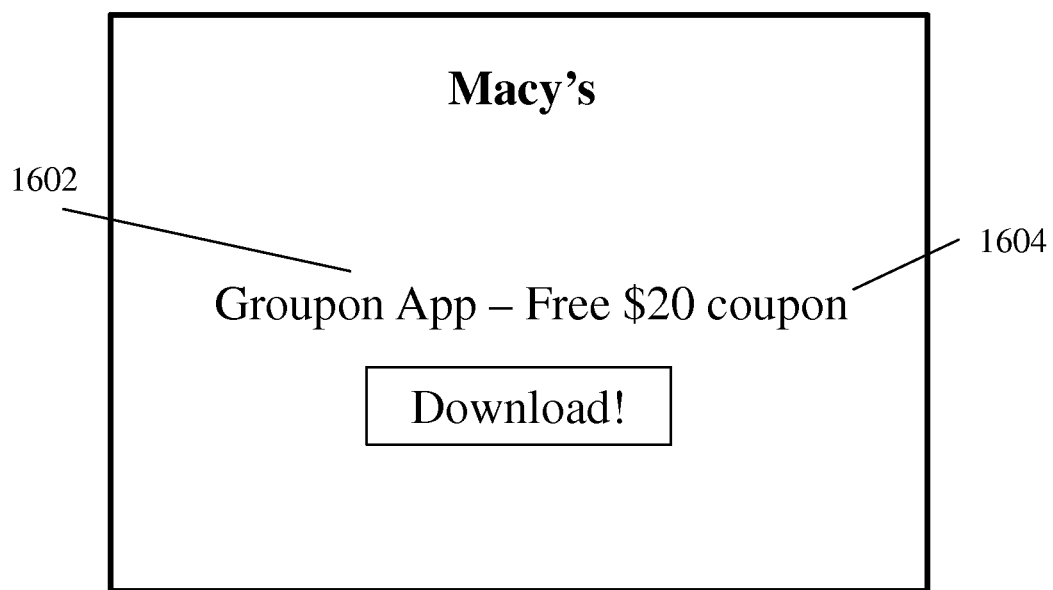
FIG. 16 illustrates an exemplary user interface provided by a first application program associated with a retail merchant.

FIG. 16 illustrates an exemplary user interface 1600 provided by a first application program associated with a retail merchant. A computer-executable program or tool associated with a promotion and marketing service included in the first application program may cause an impression 1604 of a promotion and a representation 1602 of a promotion application program to be rendered on the user interface 1600. Selection of the representation 1602 by the user of the mobile computing device may cause automatic download of the promotion application program and may provide the promotion to the user.

VI. Launching Other Application Programs from Promotion Application Program

In certain embodiments, a promotion application program provided by a promotion and marketing service may launch one or more additional application programs on a mobile computing device to enable a user to view goods and services associated with a promotion. The promotion application program may be configured to render an impression of a promotion on a visual display of the computing device. The promotion application program may also be configured to receive user input selecting the impression and indicating that the user wishes to purchase the promotion.

A promotion offered by the promotion and marketing service may pertain to a product or service sold by a merchant. Certain merchants provide application programs for enabling purchase of their products and services using a mobile computing device. If the user's mobile computing device already has installed thereon a merchant application program associated with a product or service of a selected promotion, then the promotion application program may automatically launch the merchant application program upon selection of the promotion. In one embodiment, the promotion application program may launch another application program by accessing a corresponding link for the application program (e.g., Nordstrom://products?id=927832 for launching a specific product page for the Nordstrom application program). This enables the user to directly purchase the product or service associated with the promotion and provided by the merchant using the merchant's application program without having to browse the merchant's website for the associated product or service. For example, if the user selects, using the promotion application program, a promotion for a product offered by the retail store Nordstrom, then the Nordstrom application program may be launched automatically to the corresponding product page. On the other hand, if the promotion application program determines that the merchant application program is not installed on the mobile computing device, then it may automatically launch the website of the merchant on a webpage for the product or service associated with the selected promotion.

Figure 17:
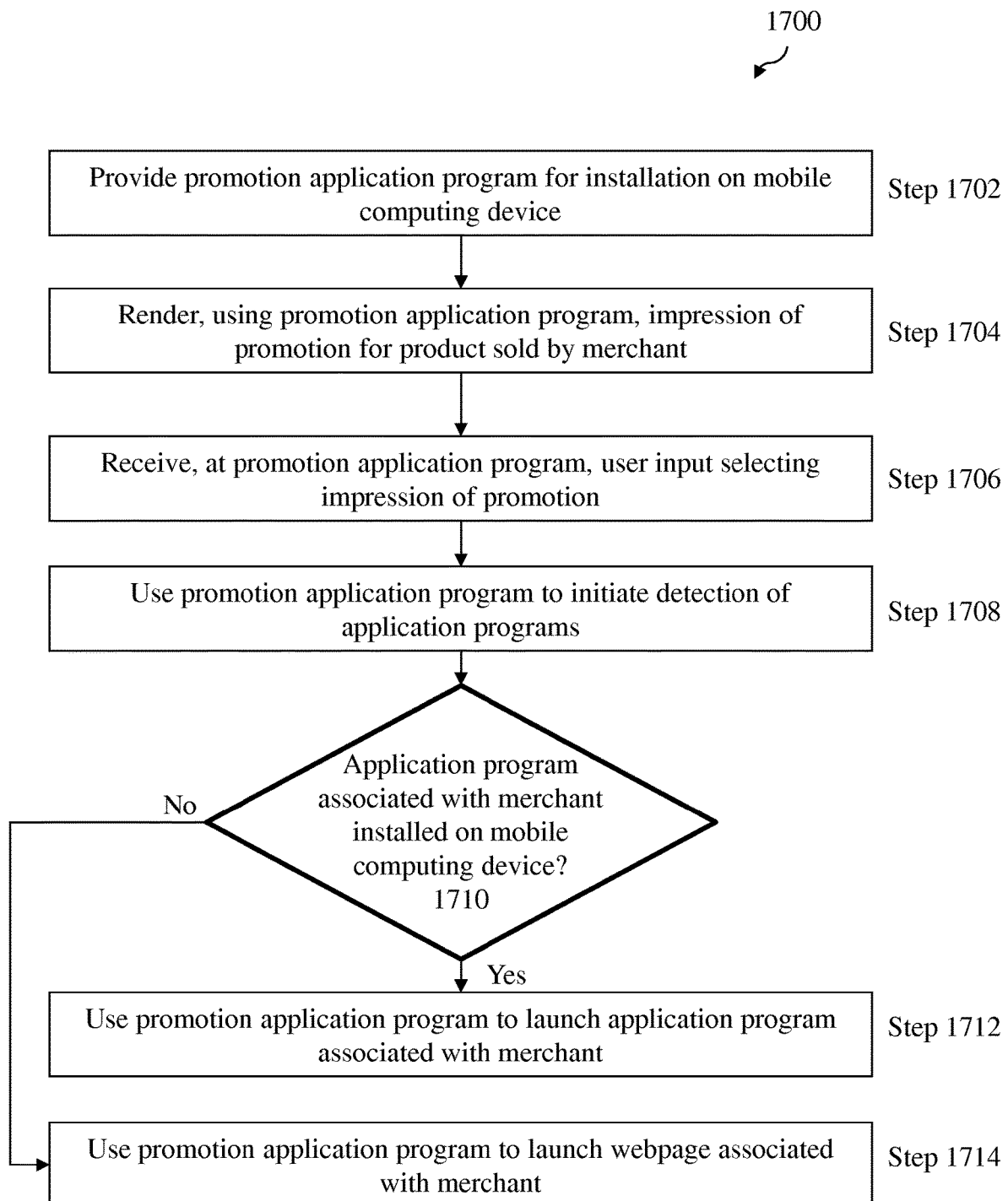
FIG. 17 is a flowchart illustrating an exemplary computer-executable method for a promotion and marketing service for launching application programs to enable a user of a mobile computing device to purchase a product or service.

FIG. 17 is a flowchart illustrating an exemplary computer-executable method 1700 for a promotion and marketing service for launching application programs to enable a user of a mobile computing device to purchase a product or service. In step 1702, the promotion and marketing service may provide a promotion application program for installation of the mobile computing device. In step 1704, upon installation of the promotion application program, the promotion application program may render an impression of a promotion. In step 1706, the promotion application program may receive user input selecting the impression of the promotion. In step 1708, the promotion application program may initiate detection of other application programs installed on the mobile computing device. Any of the exemplary techniques for detecting application programs as disclosed herein may be used.

In step 1710, the promotion application program may determine if the installed application programs include an application program provided by a merchant associated with the promotion. If the merchant application program is installed on the mobile computing device, the promotion application program may automatically launch the merchant application program to a user interface that presents the product or service associated with the promotion, in step 1712. If the merchant application program is not installed on the mobile computing device, the promotion application program may automatically launch a web browser on the mobile computing device to a webpage of a website provided by the merchant and associated with the product or service of the promotion, in step 1714.

In certain embodiments, if the promotion application program determines that the selected promotion is sold out or expired, then it may automatically launch the merchant application program to a predetermined user interface or to render predetermined information, for example, displaying a different product than the one offered by the promotion.

In certain embodiments, the promotion application program may launch a first application program based on the presence of a second application program on a user's mobile computing device. For example, if the computing device is determined to include a coffee retailer application program (e.g., a Starbucks application program as determined by the promotion application program from an sbux:// link), then an online retail directory service (e.g., Yelp) may be provided the ability to market coffee stores near the user's location. In this case, the promotion application program may automatically launch an application program associated with the online retail directory service to a page appropriate for coffee and the user's location (e.g., using a yelp4://search?term=coffee link).

VII. Exemplary Computing Devices

Systems and methods disclosed herein may include one or more programmable processing units having associated therewith executable instructions held on one or more computer readable media, RAM, ROM, hard drive, and/or hardware. In exemplary embodiments, the hardware, firmware and/or executable code may be provided, for example, as upgrade module(s) for use in conjunction with existing infrastructure (for example, existing devices/processing units). Hardware may, for example, include components and/or logic circuitry for executing the embodiments taught herein as a computing process.

Displays and/or other feedback means may also be included, for example, for rendering a graphical user interface, according to the present disclosure. The display and/or other feedback means may be stand-alone equipment or may be included as one or more components/modules of the processing unit(s).

The actual software code or control hardware which may be used to implement some of the present embodiments is not intended to limit the scope of such embodiments. For example, certain aspects of the embodiments described herein may be implemented in code using any suitable programming language type such as, for example, assembly code, C, C# or C++ using, for example, conventional or object-oriented programming techniques. Such code is stored or held on any type of suitable non-transitory computer-readable medium or media such as, for example, a magnetic or optical storage medium.

As used herein, a "processor," "processing unit," "computer" or "computer system" may be, for example, a wireless or wire line variety of a microcomputer, minicomputer, server, mainframe, laptop, personal data assistant (PDA), wireless e-mail device (for example, "BlackBerry," "Android" or "Apple," trade-designated devices), cellular phone, pager, processor, fax machine, scanner, or any other programmable device configured to transmit and receive data over a network. Computer systems disclosed herein may include memory for storing certain software applications used in obtaining, processing and communicating data. It can be appreciated that such memory may be internal or external to the disclosed embodiments. The memory may also include non-transitory storage medium for storing software, including a hard disk, an optical disk, floppy disk, ROM (read only memory), RAM (random access memory), PROM (programmable ROM), EEPROM (electrically erasable PROM), flash memory storage devices, or the like.

Figure 18:
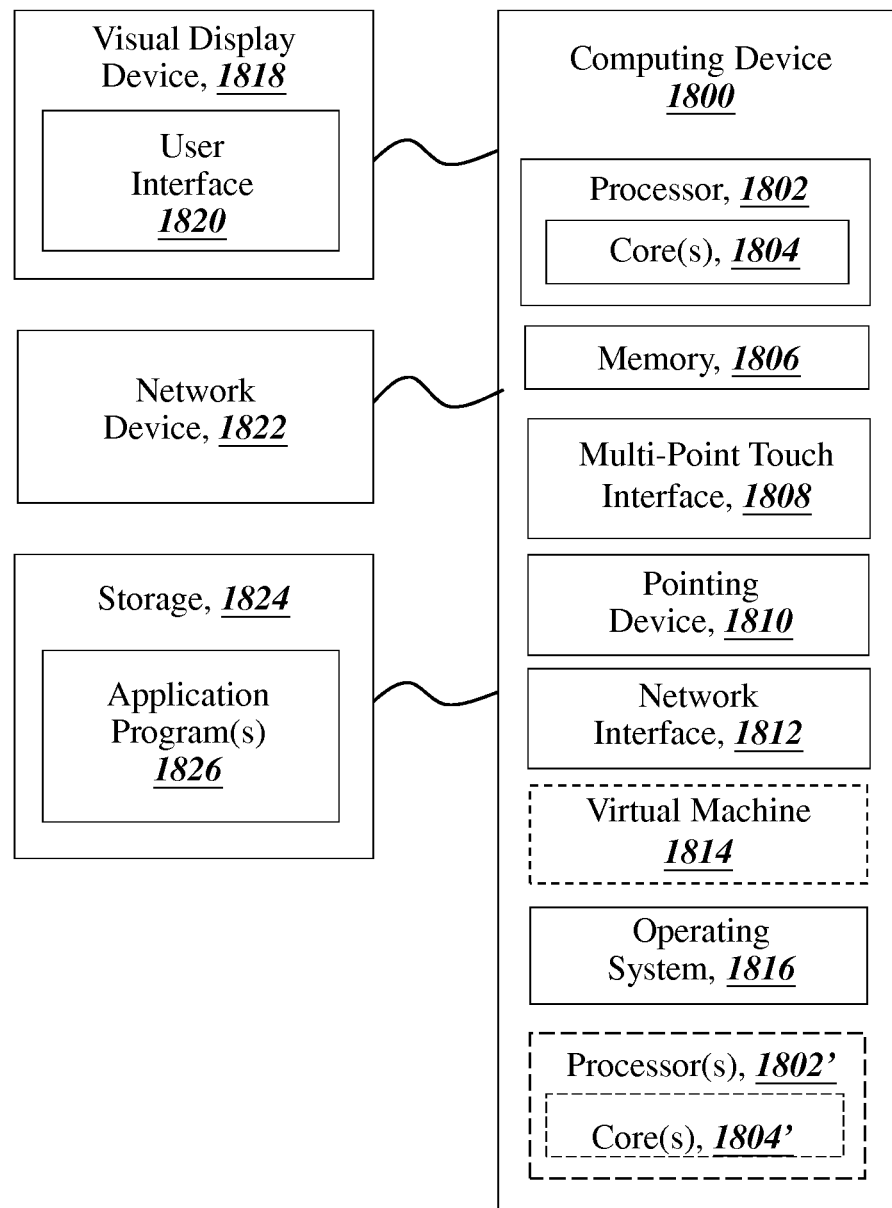
FIG. 18 depicts a block diagram representing an exemplary mobile or non-mobile computing device that may be used to implement the systems and methods disclosed herein.

FIG. 18 depicts a block diagram representing an exemplary mobile or non-mobile computing device 1800 that may be used to implement the systems and methods disclosed herein. The computing device 1800 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described herein. In exemplary embodiments, a distributed computational system may include a plurality of such computing devices.

The computing device 1800 includes one or more non-transitory computer-readable media having encoded thereon one or more computer-executable instructions or software for implementing the exemplary methods described herein. The non-transitory computer-readable media may include, but are not limited to, one or more types of hardware memory and other tangible media (for example, one or more magnetic storage disks, one or more optical disks, one or more USB flash drives), and the like. For example, memory 1806 included in the computing device 1800 may store computer-readable and computer-executable instructions or software for implementing a graphical user interface as described herein. The computing device 1800 also includes processor 1802 and associated core 1804, and in some embodiments, one or more additional processor(s) 1802' and associated core(s) 1804' (for example, in the case of computer systems having multiple processors/cores), for executing computer-readable and computer-executable instructions or software stored in the memory 1802 and other programs for controlling system hardware. Processor 1802 and processor(s) 1802' may each be a single core processor or a multiple core (1804 and 1804') processor.

Virtualization may be employed in the computing device 1800 so that infrastructure and resources in the computing device may be shared dynamically. A virtual machine 1814 may be provided to handle a process running on multiple processors so that the process appears to be using only one computing resource rather than multiple computing resources. Multiple virtual machines may also be used with one processor.

Memory 1806 may include a computer system memory or random access memory, such as DRAM, SRAM, EDO RAM, and the like. Memory 1806 may include other types of memory as well, or combinations thereof.

A user may interact with the computing device 1800 through a visual display device 1818, such as a screen or monitor, which may display one or more graphical user interfaces 1820 provided in accordance with exemplary embodiments described herein. The visual display device 1818 may also display other aspects, elements and/or information or data associated with exemplary embodiments.

The computing device 1800 may include other I/O devices for receiving input from a user, for example, a keyboard or any suitable multi-point touch interface 1608 or pointing device 1810 (e.g., a mouse, a user's finger interfacing directly with a display device). As used herein, a "pointing device" is any suitable input interface, specifically, a human interface device, that allows a user to input spatial data to a computing system or device. In an exemplary embodiment, the pointing device may allow a user to provide input to the computer using physical gestures, for example, pointing, clicking, dragging, dropping, and the like. Exemplary pointing devices may include, but are not limited to, a mouse, a touchpad, a finger of the user interfacing directly with a display device, and the like.

The keyboard 1808 and the pointing device 1810 may be coupled to the visual display device 1818. The computing device 1800 may include other suitable conventional I/O peripherals. The I/O devices may facilitate implementation of the one or more graphical user interfaces 1820, for example, implement one or more of the graphical user interfaces described herein.

The computing device 1800 may include one or more storage devices 1824, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement exemplary embodiments as taught herein. In exemplary embodiments, the one or more storage devices 1824 may provide storage for data that may be generated by the systems and methods of the present disclosure. For example, a storage device 1824 may provide storage for computer-executable instructions configured to run one or more application programs 1826. The one or more storage devices 1824 may be provided on the computing device 1800 and/or provided separately or remotely from the computing device 1800. The exemplary components depicted as being stored on storage device 1824 may be stored on the same or on different storage devices.

The computing device 1800 may include a network interface 1812 configured to interface via one or more network devices 1822 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1812 may include a built-in network adapter, network interface card, PCMCIA network card, card bus network adapter, wireless network adapter, USB network adapter, modem or any other device suitable for interfacing the computing device 1800 to any type of network capable of communication and performing the operations described herein. The network device 1822 may include one or more suitable devices for receiving and transmitting communications over the network including, but not limited to, one or more receivers, one or more transmitters, one or more transceivers, one or more antennae, and the like.

The computing device 1800 may run any operating system 1816, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 1816 may be run in native mode or emulated mode. In an exemplary embodiment, the operating system 1816 may be run on one or more cloud machine instances.

One of ordinary skill in the art will recognize that exemplary computational system 1800 may include more or fewer modules than those shown in FIG. 18.

In describing exemplary embodiments, specific terminology is used for the sake of clarity. For purposes of description, each specific term is intended to, at least, include all technical and functional equivalents that operate in a similar manner to accomplish a similar purpose. Additionally, in some instances where a particular exemplary embodiment includes a plurality of system elements or method steps, those elements or steps may be replaced with a single element or step. Likewise, a single element or step may be replaced with a plurality of elements or steps that serve the same purpose. Further, where parameters for various properties are specified herein for exemplary embodiments, those parameters may be adjusted up or down by $\frac{1}{20}$th, $\frac{1}{10}$th, $\frac{1}{5}$th, $\frac{1}{3}$rd, $\frac{1}{2}$nd, and the like, or by rounded-off approximations thereof, unless otherwise specified. Moreover, while exemplary embodiments have been shown and described with references to particular embodiments thereof, those of ordinary skill in the art will understand that various substitutions and alterations in form and details may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than shown.

Blocks of the block diagram and the flow chart illustrations support combinations of means for performing the specified functions, combinations of steps for performing the specified functions and program instruction means for performing the specified functions. It will also be understood that some or all of the blocks/steps of the circuit diagram and process flowchart, and combinations of the blocks/steps in the circuit diagram and process flowcharts, can be implemented by special purpose hardware-based computer systems that perform the specified functions or steps, or combinations of special purpose hardware and computer instructions. Exemplary systems may include more or fewer modules than those illustrated in the exemplary block diagrams.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications, combinations and other embodiments are intended to be included within the scope of the appended claims. Although specific terms are employed herein, they are used in a generic and descriptive sense only and not for purposes of limitation.

What is claimed is:

1. A computer-executed method comprising:
    enabling a first application program executed on a user device to display impressions of promotions offered by a promotion and marketing service by incorporating a computer-executable tool into the first application program executed on the user device;
    determining that a promotion application program is associated with an unresolved state representing the promotion application program is not installed on the user device by at least, upon incorporation of the computer-executable tool, attempting access, via the computer-executable tool incorporated into the first application program executed on the user device, of an application program link associated with the promotion application program without execution of the promotion application program on the mobile computing device; and
    presenting, in the first application program executed on the user device and in response to determining the promotion application program is not installed, an impression of a promotion associated with the promotion application program.

2. The computer-executed method of claim 1, wherein the computer-executable tool is associated with the promotion and marketing service that provides the promotion application program, and wherein the computer-executable tool is external to the promotion application program provided by the promotion and marketing service.

3. The computer-executed method of claim 1, wherein the impression of the promotion is presented in the first application program together with a representation of the promotion application program.

4. The computer-executed method of claim 1, further comprising:
    storing, on a remote computing device, an indication of the first application program associated with the computer-executable tool.

5. The computer-executed method of claim 1, wherein the impression of the promotion indicates the promotion as an incentive for installing the promotion application program.

6. The computer-executed method of claim 1, the computer-executed method further comprising:
    incorporating the computer-executable tool into the first application program, wherein the first application program is unable to display impressions of promotions offered by the promotion and marketing service before incorporation of the computer-executable tool.

7. The computer-executed method of claim 1, wherein the computer executable tool is provided by the promotion and marketing service.

8. The computer-executed method of claim 1, further comprising:
    receiving, at the first application program, user input selecting the impression of the promotion application program;
    initiating download of the promotion application program to the user device; and
    automatically providing the promotion to the user device response to download of the promotion application program.

9. The computer-executed method of claim 1, further comprising:
    detecting, using the computer-executable tool, successful download of the promotion application program to the user device; and
    providing the promotion to the user device in response to detecting the successful download of the promotion application program.

10. The computer-executed method of claim 1, further comprising:
    storing, via the computer-executable tool, data representing one or more user interactions with the first application program via the user device; and
    transmitting, in response to download of the promotion application program to the user device, the data for use by the promotion application program.

11. A computer program product comprising one or more non-transitory computer-readable media having computer program code stored thereon, the computer program code in execution with at least one processor to configure the processor for:
    enabling a first application program executed on a user device to display impressions of promotions offered by a promotion and marketing service by at least incorporating a computer-executable tool into the first application program executed on the user device;
    determining that a promotion application program is associated with an unresolved state representing the promotion application program is not installed on the user device by at least, upon incorporation of the computer-executable tool, attempting access, via the computer-executable tool incorporated into the first application program executed on the user device, of an application program link associated with the promotion application program without execution of the promotion application program on the user device; and presenting in the first application program executed on the user device and in response to determining the promotion application program is not installed, an impression of a promotion associated with the promotion application program.

12. The computer program product of claim 11, further configured for:

receiving, at the first application program, user input selecting the impression of the promotion application program;

initiating download of the promotion application program to the user device; and automatically providing the promotion to the user device in response to download of the promotion application program.

13. An apparatus comprising:

a storage device having computer-coded instructions stored thereon;

a visual display;

a processing device configured, in execution with the computer-coded instructions stored on the storage device, to:

enable a first application program executed on the apparatus, via a computer-executable tool incorporated into the first application program, to display impressions of promotions offered by a promotion and marketing service;

determine that a promotion application program is associated with an unresolved state representing the promotion application program is not installed on the apparatus by at least, upon incorporation of the computer-executable tool, attempt access, utilizing the computer-executable tool incorporated into the first application program executed on the apparatus, of an application program link associated with the promotion application program without execution of the promotion application program on the apparatus; and presenting, via the visual display and in the first application program executed on the apparatus in response to determining the promotion application program is not installed, an impression of a promotion associated with the promotion application program.

14. The apparatus of claim 13, wherein the computer-executable tool is associated with the promotion and marketing service that provides the promotion application program, and wherein the computer-executable tool is external to the promotion application program provided by the promotion and marketing service.

15. The apparatus of claim 13, wherein the impression of the promotion is presented in the first application program together with a representation of the promotion application program.

16. The apparatus of claim 13, wherein the processing device is further configured to:

store, on a remote computing device, an indication of the first application program associated with the computer-executable tool.

17. The apparatus of claim 13, wherein the processing device is further configured to:

incorporate the computer-executable tool into the first application program, wherein the first application program is unable to display impressions of promotions offered by the promotion and marketing service before incorporation of the computer-executable tool.

18. The apparatus of claim 13, wherein the processing device is further configured to:

receive, at the first application program, user input selecting the impression of the promotion application program;

initiate download of the promotion application program to the user device; and automatically provide the promotion to the user device in response to download of the promotion application program.

19. The apparatus of claim 13, wherein the processing device is further configured to:

detect, using the computer-executable tool, successful download of the promotion application program to the apparatus; and provide the promotion via the apparatus in response to detecting the successful download of the promotion application program.

20. The apparatus of claim 13, wherein the processing device is further configured to:

store, utilizing the computer-executable tool, data representing one or more user interactions with the first application program via the apparatus; and transmit, in response to download of the promotion application program to the apparatus, the data for use by the promotion application program.

* * * * *